US008494183B2

(12) United States Patent
Sunaga et al.

(10) Patent No.: US 8,494,183 B2
(45) Date of Patent: Jul. 23, 2013

(54) AUDIO PROCESSING APPARATUS

(75) Inventors: Tadaharu Sunaga, Osaka (JP); Susumu Koaze, Osaka (JP); Junichi Kobayashi, Osaka (JP); Norio Etoh, Osaka (JP); Yataro Yajima, Osaka (JP); Shintaro Jo, Osaka (JP); Ayako Nakatani, Osaka (JP); Yohei Koike, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 401 days.

(21) Appl. No.: 13/022,698

(22) Filed: Feb. 8, 2011

(65) Prior Publication Data

US 2011/0142262 A1 Jun. 16, 2011

Related U.S. Application Data

(63) Continuation-in-part of application No. 12/564,196, filed on Sep. 22, 2009.

(30) Foreign Application Priority Data

Feb. 3, 2009 (JP) .................................. 2009-23103

(51) Int. Cl.
*H02B 1/00* (2006.01)
*H04R 5/00* (2006.01)
*H04R 5/02* (2006.01)

(52) U.S. Cl.
USPC ............... 381/123; 381/27; 381/28; 381/307; 381/81

(58) Field of Classification Search
USPC ................. 381/1, 17, 18, 19, 22, 23, 27, 307, 381/56, 58, 80, 81, 119, 120, 123, 28; 700/94
See application file for complete search history.

(56) References Cited

U.S. PATENT DOCUMENTS 6,167,140 A 12/2000 Watanabe
6,681,018 B1 1/2004 Asakura et al.
7,978,865 B2 * 7/2011 Sunaga et al. ................ 381/123

(Continued)

FOREIGN PATENT DOCUMENTS

EP 0866638 9/1998
EP 2 222 097 A1 8/2010

(Continued)

OTHER PUBLICATIONS

Co-pending U.S. Appl. No. 12/564,196, filed Sep. 22, 2009 (current claims provided).

(Continued)

*Primary Examiner* — Xu Mei
(74) *Attorney, Agent, or Firm* — Renner, Otto, Boisselle & Sklar, LLP

(57) ABSTRACT

A switching section causes the first amplification section to amplify the expansion left audio signal and supply the amplified expansion left audio signal to the first speaker terminal and causing the second amplification section to amplify the expansion right audio signal and supply the amplified expansion right audio signal to the second speaker terminal when the Bi-Amp function is not used. The switching section causes the first amplification section to amplify the left audio signal for Bi-Amp and supply the amplified left audio signal for Bi-Amp the first speaker terminal and causing the second amplification section to amplify the right audio signal for Bi-Amp and supply the amplified right audio signal for Bi-Amp to the second speaker terminal when the Bi-Amp function is used.

5 Claims, 14 Drawing Sheets

U.S. PATENT DOCUMENTS

| | | | | |
|---|---|---|---|---|
| 8,081,781 | B2 * | 12/2011 | Watanabe | 381/123 |
| 2002/0006081 | A1 | 1/2002 | Fujishita | |
| 2007/0127925 | A1 | 6/2007 | Hayashibara | |
| 2009/0016539 | A1 | 1/2009 | Watanabe | |

FOREIGN PATENT DOCUMENTS

| | | |
|---|---|---|
| JP | 03-080639 | 4/1991 |
| JP | 07-162384 | 6/1995 |
| JP | 10-313223 | 11/1998 |
| JP | 2002-345100 | 11/2002 |
| JP | 2006-237928 | 9/2006 |
| JP | 2006-279537 | 10/2006 |
| JP | 2007-150406 | 6/2007 |
| JP | 2007-151173 | 6/2007 |
| JP | 2007-158561 | 6/2007 |
| JP | 2010-183202 | 8/2010 |

OTHER PUBLICATIONS

European Search Report for corresponding European Application No. 10 151 516.1 dated Mar. 25, 2011.

Eidson et al., “30.2: HDMI: High-Definition Multimedia Interface”, 2003 SID International Symposium—May 20 2003, Baltimore, Maryland, vol. XXXIV, p. 1024, XP007008293.

European Search Report for corresponding European Application No. 11189124.8 dated May 6, 2013.

* cited by examiner

AUDIO PROCESSING APPARATUS

This is a Continuation-in-Part of co-pending U.S. application Ser. No. 12/564,196 filed on Sep. 22, 2009, the entire contents of which are incorporated herein by reference.

BACKGROUND OF THE INVENTION

1. Field of the Invention

The present invention relates to an audio processing apparatus.

2. Description of the Related Art

An audio playback system including a BD player, an AV amplifier, and a display apparatus has been used. Audio data transmitted from the BD player to the AV amplifier is obtained by encoding multichannel audio data. For example, the multichannel audio data includes, as shown in FIG. 3, a left audio signal L, a right audio signal R, a center audio signal C, a low-frequency audio signal SW, a surround left audio signal SL, a surround right audio signal SR, a surround back left audio signal SBL, and a surround back right audio signal SBR. Recently, HD (High Definition) related audio formats such as Dolby True HD, Dolby Digital Plus, and DTS-HD have appeared. In these formats, an upper left audio signal LH, an upper right audio signal RH, an outer left audio signal LW, and an outer right audio signal RW are further added.

However, when amplifiers associated with audio signals of all these channels are provided to the AV amplifier, amplifiers for 11.1 channels in total are to be provided, resulting in very high cost. Furthermore, the amplifiers for further 2 channels are needed when the left audio signal and the right audio signal are reproduced using the Bi-Amp function, resulting in very high cost. If performing the Bi-Amp function using amplifiers for the surround back left audio signal and the surround back right audio signal, the left audio signal and the right audio signal are not able to be reproduced by using the Bi-Amp function in the state that the surround back left audio signal and the surround back right audio signal are reproduced.

SUMMARY OF THE INVENTION

An object of the present invention is to provide an audio processing apparatus capable of amplifying the left audio signal L and the right audio signal R using the Bi-Amp function in the state that the surround back left audio signal SBL and the surround back right audio signal are reproduced without providing the dedicated amplifiers for the Bi-Amp function.

According to a preferred embodiment of the present invention, an audio processing apparatus comprises: a first amplification section for amplifying an expansion left audio signal whish is one of an outer left audio signal, an upper left audio signal and a center left audio signal, or a left audio signal for Bi-Amp; a second amplification section for amplifying an expansion right audio signal whish is one of an outer right audio signal, an upper right audio signal and a center right audio signal, or a right audio signal for Bi-Amp; a third amplification section for amplifying a surround back left audio signal; a fourth amplification section for amplifying a surround back right audio signal; a first speaker terminal that outputs the expansion left audio signal or the left audio signal for Bi-Amp; a second speaker terminal that outputs the expansion right audio signal or the right audio signal for Bi-Amp; a third speaker terminal that outputs the surround back left audio signal; a fourth speaker terminal that outputs the surround back right audio signal; and switching section for causing the first amplification section to amplify the expansion left audio signal and supply the amplified expansion left audio signal to the first speaker terminal and causing the second amplification section to amplify the expansion right audio signal and supply the amplified expansion right audio signal to the second speaker terminal when the Bi-Amp function is not used; and causing the first amplification section to amplify the left audio signal for Bi-Amp and supply the amplified left audio signal for Bi-Amp to the first speaker terminal and causing the second amplification section to amplify the right audio signal for Bi-Amp and supply the amplified right audio signal for Bi-Amp to the second speaker terminal when the Bi-Amp function is used.

Preferably, the third amplification section amplifies the surround back left audio signal or a center audio signal for Bi-Amp; the third speaker terminal outputs the surround back left audio signal or the center audio signal for Bi-Amp, and the switching section causes the third amplification section to amplify the surround back left audio signal and supply the amplified surround back left audio signal to the third speaker terminal when the Bi-Amp function is not used; and causes the third amplification section to amplify the center audio signal for Bi-Amp and supply the amplified center audio signal for Bi-Amp to the third speaker terminal when the Bi-Amp function is used.

Preferably, when the Bi-Amp function is used, the switching section causes the fourth amplification section to amplify the adding signal that is a signal produced by adding the surround back left audio signal and the surround back right audio signal and supply the amplified adding signal to the fourth speaker terminal.

Preferably, the third amplification section amplifies the surround back left audio signal or the surround left audio signal for Bi-Amp; the fourth amplification section amplifies the surround back right audio signal or the surround right audio signal for Bi-Amp; the third speaker terminal outputs the surround back left audio signal or the surround left audio signal for Bi-Amp, the fourth speaker terminal outputs the surround back right audio signal or the surround right audio signal for Bi-Amp, and the switching section causes the third amplification section to amplify the surround back left audio signal and supply the amplified surround back left audio signal to the third speaker terminal and the fourth amplification section to amplify the surround back right audio signal and supply the amplified surround back right audio signal to the fourth speaker terminal when the Bi-Amp function is not used; and causes the third amplification section to amplify the surround left audio signal for Bi-Amp and supply the amplified surround left audio signal for Bi-Amp to the third speaker terminal and the fourth amplification section to amplify the surround right audio signal for Bi-Amp and supply the amplified surround right audio signal for Bi-Amp to the fourth speaker terminal when the Bi-Amp function is used.

Preferably, the audio processing apparatus further comprising: a fifth speaker terminal that outputs the second expansion left audio signal whish is one of the outer left audio signal, the upper left audio signal and the center left audio signal and is different from the expansion left audio signal; a sixth speaker terminal that outputs the second expansion right audio signal whish is one of the outer right audio signal, the upper right audio signal and the center right audio signal and is different from the expansion right audio signal; and channel determination section for determining which one of a combination of the expansion left audio signal and the expansion right audio signal and a combination of the second expansion left audio signal and second expansion right audio signal is included in multichannel audio data. In case that the Bi-Amp function is not used, the switching section causes the first amplification section to amplify the expansion left audio signal and supply the amplified expansion left audio signal to the first speaker terminal and causes the second amplification section to amplify the expansion right audio signal and supply the amplified expansion right audio signal to the second speaker terminal when the combination of the expansion left audio signal and the expansion right audio signal is determined to be included; and causes the first amplification section to amplify the second expansion left audio signal and supply the amplified second expansion left audio signal to the fifth speaker terminal and causes the second amplification section to amplify the second expansion right audio signal and supply the amplified second expansion right audio signal to the sixth speaker terminal when the combination of the second expansion left audio signal and second expansion right audio signal is determined to be included.

DETAILED DESCRIPTION OF THE PREFERRED EMBODIMENTS

Audio playback systems including a disc playback apparatus (hereinafter, referred to as the BD player), an audio processing apparatus (hereinafter, referred to as the AV amplifier), and a display apparatus, according to preferred embodiments of the present invention will be specifically described below with reference to the drawings but the present invention is not limited thereto.

Figure 1:
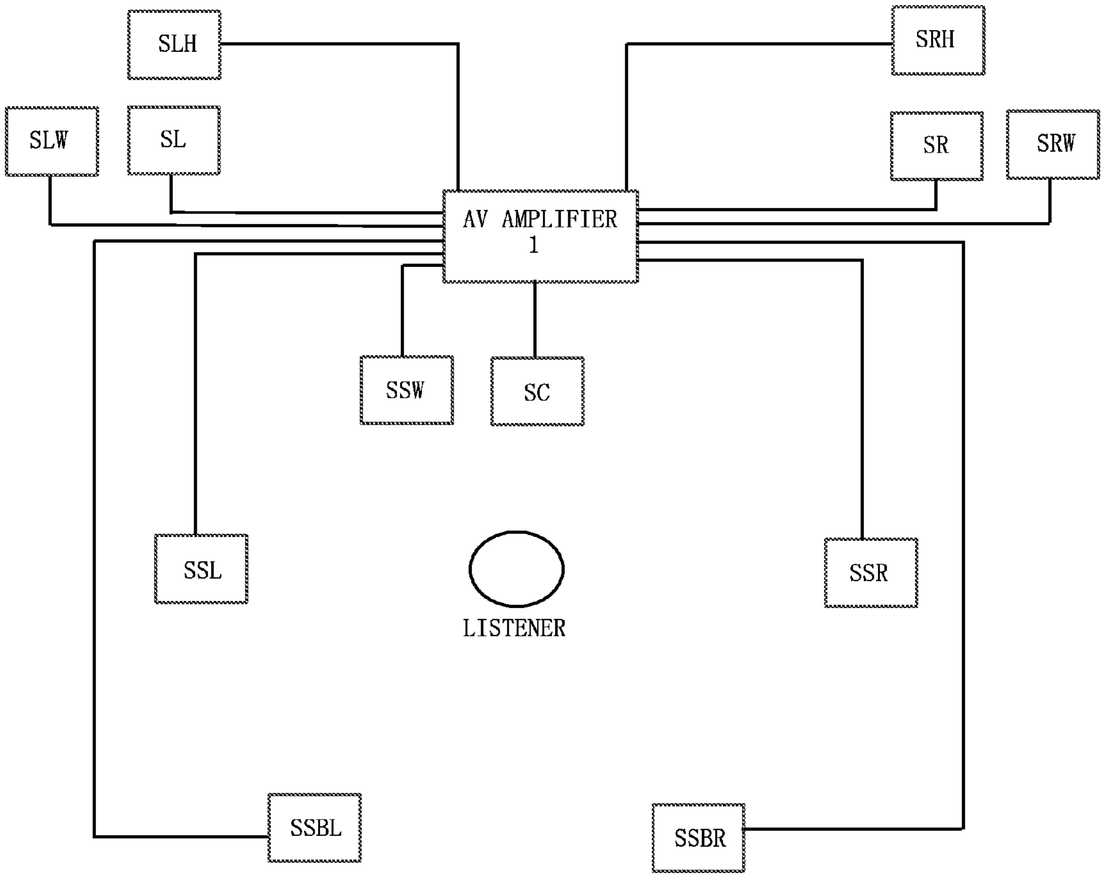
FIG. 1 is a diagram showing an arrangement of an AV amplifier 1 and speakers.

FIG. 1 is a diagram showing an example of an arrangement of an AV amplifier 1 and speakers. To the AV amplifier 1 are connected a left speaker SL, a right speaker SR, a center speaker SC, a low-frequency speaker SSW, a surround left speaker SSL, a surround right speaker SSR, a surround back left speaker SSBL, a surround back right speaker SSBR, an upper left speaker SLH, an upper right speaker SRH, an outer left speaker SLW, and an outer right speaker SRW.

Figure 2:
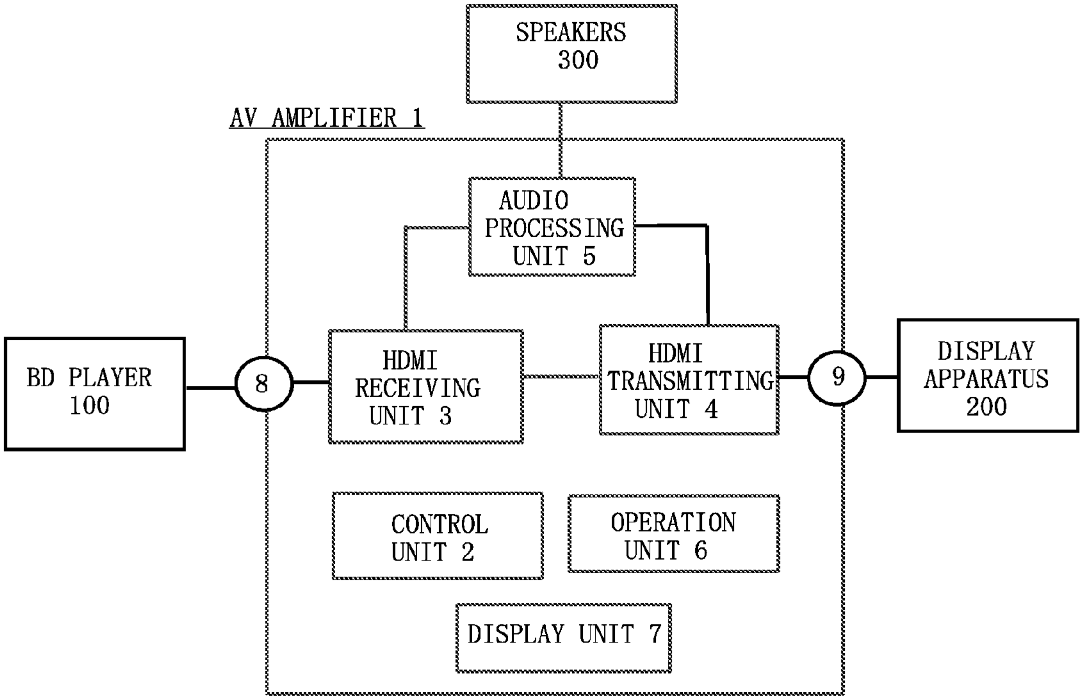
FIG. 2 is a diagram showing an audio playback system.

FIG. 2 is a block diagram showing a configuration of an audio playback system. A BD player 100, an AV amplifier 1, and a display apparatus 200 conform to the HDMI standard, for example, and are connected to each other via HDMI cables. The BD player 100 transmits HDMI data including multichannel audio data and video data to the AV amplifier 1. The AV amplifier 1 amplifies the multichannel audio data included in the HDMI data received from the BD player 100 and outputs the amplified multichannel audio data to speakers. Also, the AV amplifier 1 transmits the HDMI data including video data to the display apparatus 200. The display apparatus 200 displays the video data included in the HDMI data received from the AV amplifier 1.

The AV amplifier 1 has a control unit 2, an HDMI receiving unit 3, an HDMI transmitting unit 4, an audio processing unit 5, an operation unit 6, a display unit 7, and HDMI terminals 8 and 9. To the AV amplifier 1 are connected speakers 300 (corresponding to the speakers in FIG. 1).

The HDMI receiving unit 3 receives HDMI data transmitted from the BD player 100, generates original video data from the received HDMI data, and supplies the video data to the HDMI transmitting unit 4. Also, the HDMI receiving unit 3 generates original multichannel audio data from the received HDMI data and supplies the multichannel audio data to the audio processing unit 5.

The audio processing unit 5 decodes the multichannel audio data supplied from the HDMI receiving unit 3, performs processes including an acoustic process, a D/A conversion process, a volume control process, an amplification process, and the like, on the decoded multichannel audio data, and supplies audio signals of various channels to the speakers 300.

Figure 3:
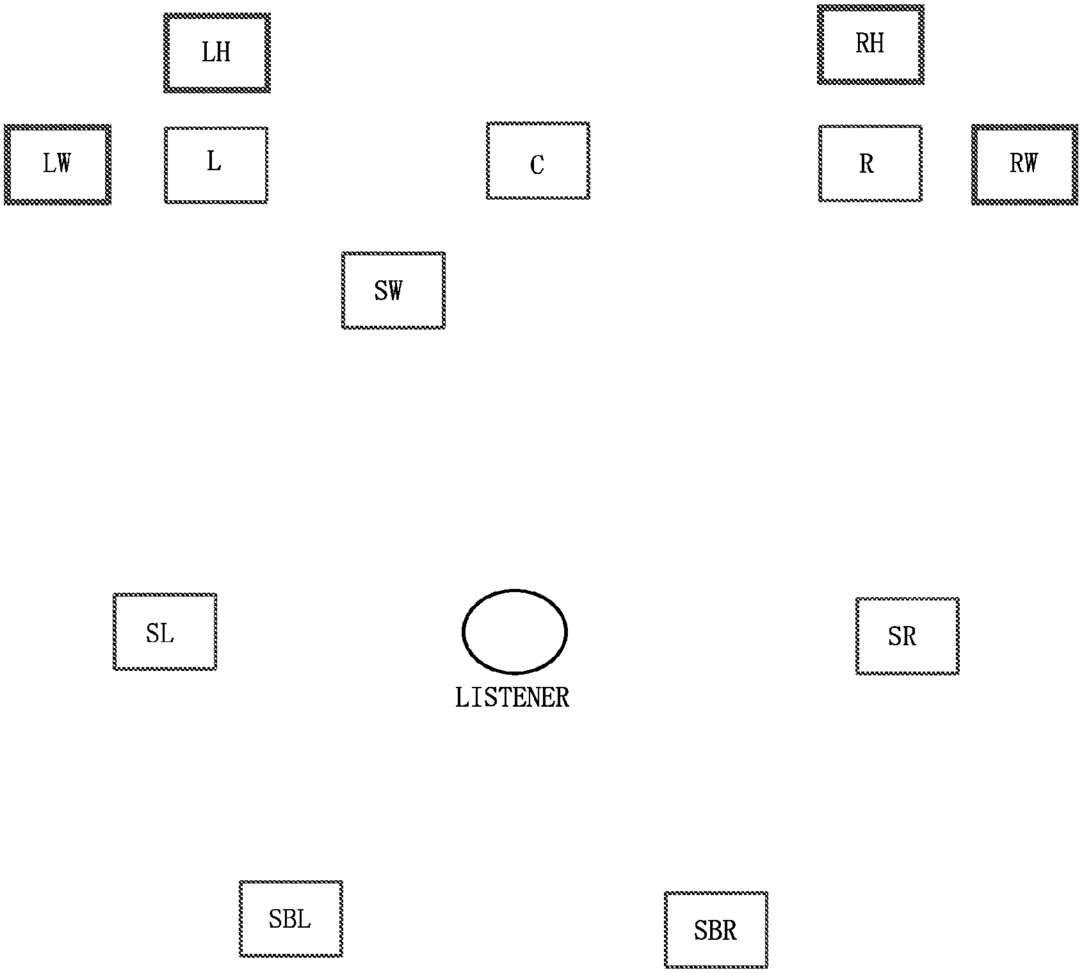
FIG. 3 is a diagram showing channels of audio signals.

Multichannel audio data to be supplied to the audio processing unit 5 will be described. In HD (High Definition) related audio formats such as Dolby True HD, Dolby Digital Plus, and DTS-HD, as shown in FIG. 3, there are, for example, a left audio signal L (front left audio signal), a right audio signal R (front right audio signal), a center audio signal C, a low-frequency audio signal SW, a surround left audio signal SL, a surround right audio signal SR, a surround back left audio signal SBL, a surround back right audio signal SBR, an outer left audio signal LW (first left audio signal), an outer right audio signal RW (first right audio signal), an upper left audio signal LH (second left audio signal), an upper right audio signal RH (second right audio signal), and the like.

The upper left audio signal LH is an audio signal played back from a position on the upper side of the left audio signal L (i.e., the front upper left side of a user). The upper right audio signal RH is an audio signal played back from a position on the upper side of the right audio signal R (i.e., the front upper right side of the user). The outer left audio signal LW is an audio signal played back from a position on the outer side (left side) of the left audio signal L (i.e., the front outer left side of the user). The outer right audio signal RW is an audio signal played back from a position on the outer side (right side) of the right audio signal R (i.e., the front outer right of the user).

Figure 4:
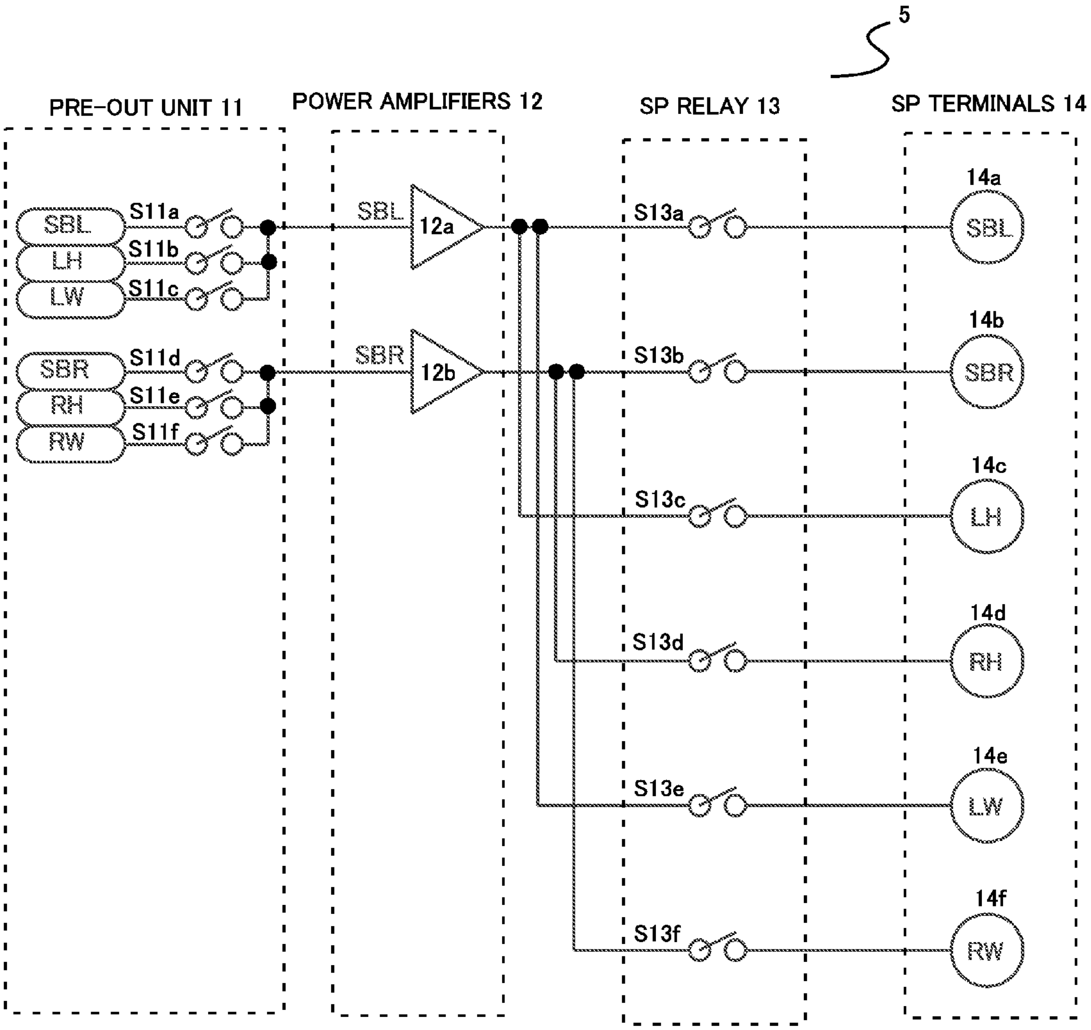
FIG. 4 is a diagram showing an audio processing unit 5.

FIG. 4 is a block diagram showing the main part of the audio processing unit 5. The audio processing unit 5 has a pre-out unit 11, power amplifiers 12, an SP (speaker) relay 13, and SP (speaker) terminals 14. In FIG. 4, circuits for basic 5.1 channels (a left audio signal L, a right audio signal R, a center audio signal C, a low-frequency audio signal SW, a surround left audio signal SL, and a surround right audio signal SR) are the same as those in conventional art and thus are not shown. A DSP and the like provided in a previous stage to the pre-out unit 11 are not shown, either.

The DSP decodes and D/A converts multichannel audio data supplied from the HDMI receiving unit 3 and thereby generates audio signals of various channels. The generated audio signals are supplied to the pre-out unit 11.

The pre-out unit 11 includes switches S11*a* to S11*f*. The switch S11*a* switches whether to output a surround back left audio signal SBL to an amplifier 12*a*. The switch S11*b* switches whether to output an upper left audio signal LH to the amplifier 12*a*. The switch S11*c* switches whether to output an outer left audio signal LW to the amplifier 12*a*. Any one of the switches S11*a* to S11*c* is brought into an on state and any one of the surround back left audio signal SBL, the upper left audio signal LH, and the outer left audio signal LW is supplied to the amplifier 12*a*.

The switch Slid switches whether to output a surround back right audio signal SBR to an amplifier 12*b*. The switch S11*e* switches whether to output an upper right audio signal RH to the amplifier 12*b*. The switch S11*f* switches whether to output an outer right audio signal RW to the amplifier 12*b*. Any one of the switches Slid to S11*f* is brought into an on state and any one of the surround back right audio signal SBR, the upper right audio signal RH, and the outer right audio signal RW is supplied to the amplifier 12*b*.

The power amplifiers 12 include the amplifiers 12*a* and 12*b*. The amplifier 12*a* amplifies the surround back left audio signal SBL, the upper left audio signal LH, or the outer left audio signal LW inputted thereto and supplies the amplified audio signal to the SP relay 13 (a switch S13*a*, S13*c*, or S13*e*). The amplifier 12*b* amplifies the surround back right audio signal SBR, the upper right audio signal RH, or the outer right audio signal RW inputted thereto and supplies the amplified audio signal to the SP relay 13 (a switch S13*b*, S13*d*, or S13*f*).

The SP relay 13 has the relay switches (hereinafter, referred to as the switches) S13*a* to S13*f*. The switch S13*a* switches whether to supply the surround back left audio signal SBL inputted from the amplifier 12*a*, to a surround back left SP terminal 14*a*. The switch S13*a* is brought into an on state when the switch S11*a* is in an on state. The switch S13*c* switches whether to supply the upper left audio signal LH inputted from the amplifier 12*a*, to an upper left SP terminal 14*c*. The switch S13*c* is brought into an on state when the switch S11*b* is in an on state. The switch S13*e* switches whether to supply the outer left audio signal LW inputted from the amplifier 12*a*, to an outer left SP terminal 14*e*. The switch S13*e* is brought into an on state when the switch S11*c* is in an on state.

The switch S13*b* switches whether to supply the surround back right audio signal SBR inputted from the amplifier 12*b*, to a surround back right SP terminal 14*b*. The switch S13*b* is brought into an on state when the switch Slid is in an on state. The switch S13*d* switches whether to supply the outer right audio signal RH inputted from the amplifier 12*b*, to an upper right SP terminal 14*d*. The switch S13*d* is brought into an on state when the switch S11*e* is in an on state. The switch 513*f* switches whether to supply the outer right audio signal RW inputted from the amplifier 12*b*, to an outer right SP terminal 14*f*. The switch S13*f* is brought into an on state when the switch S11*f* is in an on state.

The SP terminals 14 include the SP terminals 14*a* to 14*f*. The surround back left speaker SSBL is connected to the surround back left SP terminal 14*a*, the surround back right speaker SSBR is connected to the surround back right SP terminal 14*b*, the upper left speaker SLH is connected to the upper left SP terminal 14*c*, the upper right speaker SRH is connected to the upper right SP terminal 14*d*, the outer left speaker SLW is connected to the outer left SP terminal 14*e*, and the outer right speaker SRW is connected to the outer right SP terminal 14*f*.

Returning to FIG. 2, the HDMI transmitting unit 4 converts the video data supplied from the HDMI receiving unit 3 to HDMI data and transmits the HDMI data to the display apparatus 200.

The control unit 2 controls each unit based on an operating program of the AV amplifier 1 stored in a memory (not shown) built therein or connected thereto. The control unit 2 is, for example, a microcomputer or CPU.

The control unit 2 performs control to switch between the switches S11*a* to S11*f* and S13*a* to S13*f* (a detail of which will be described later).

The display unit 7 displays images showing the SP terminals 14*a* to 14*f* and the channels and functions of audio signals assigned to the SP terminals 14*a* to 14*f* (a detail of which will be described later).

Figure 5:
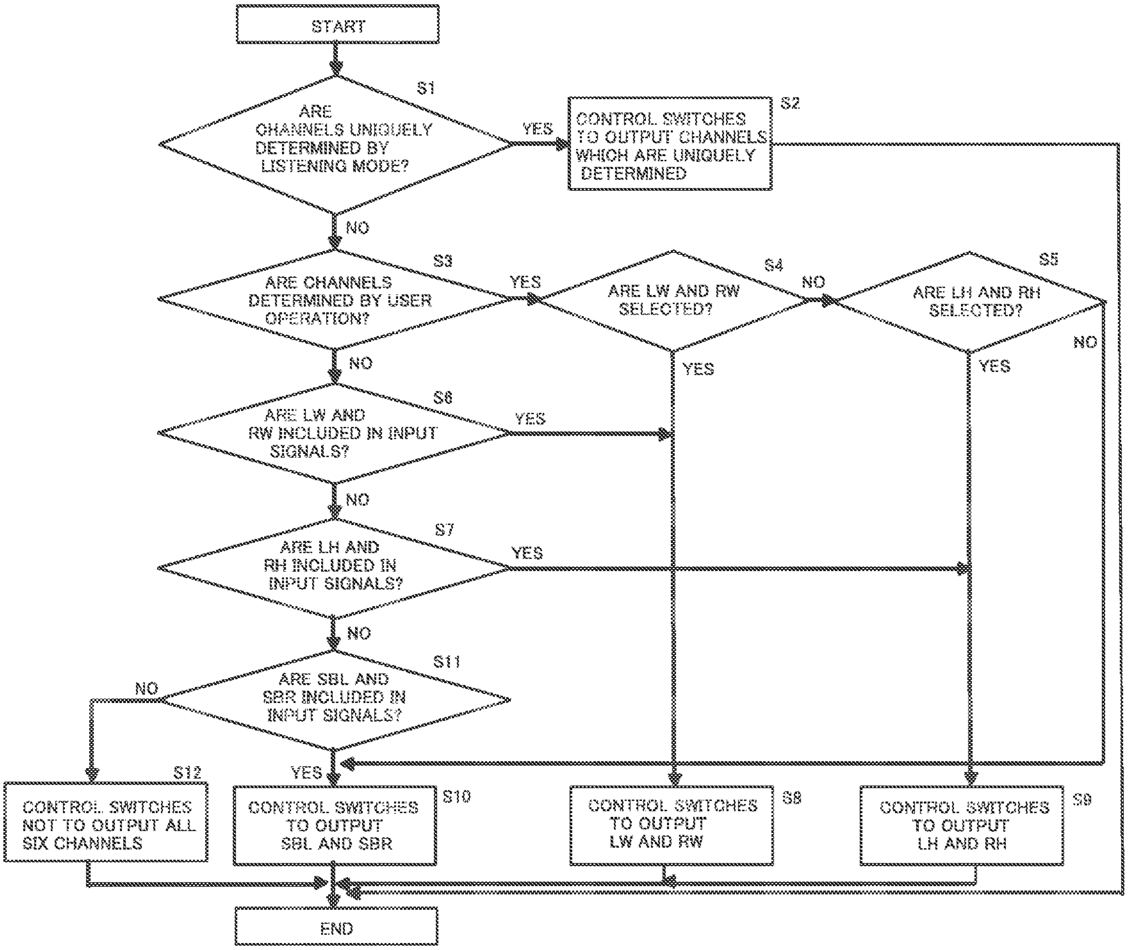
FIG. 5 is a flowchart showing a process performed by a control unit 2.

FIG. 5 is a flowchart showing a process performed by the control unit 2. The HDMI receiving unit 3 generates original multichannel audio data from HDMI data and supplies the multichannel audio data to the audio processing unit 5. The audio processing unit 5 decodes the multichannel audio data, reads channel information included in an information area of the multichannel audio data, and supplies the channel information to the control unit 2.

The control unit 2 determines whether a determination as to whether which one of a combination of the surround back left audio signal SBL and the surround back right audio signal SBR, a combination of the upper left audio signal LH and the upper right audio signal RH, and a combination of the outer left audio signal LW and the outer right audio signal RW is supplied to corresponding SP terminals is uniquely made by a listening mode selected by a user operation (S1). If the determination is uniquely made (YES in S1), then the control unit 2 controls the switches S11*a* to S11*f* and S13*a* to S13*f* to supply a combination to be determined to corresponding SP terminals (S2).

If the determination is not uniquely made (NO in S1), then the control unit 2 determines whether in the listening mode selected by the user operation a channel combination to be supplied to SP terminals is determined by a user operation (S3). If a channel combination is thus determined (YES in S3), then the control unit 2 controls the switches S11*a* to S11*f* and S13*a* to S13*f* to supply a channel combination to be determined to corresponding SP terminals (S4, S5, and S8 to S10).

If a channel combination is not thus determined (NO in S3), then the control unit 2 determines which one of a combination of the surround back left audio signal SBL and the surround back right audio signal SBR, a combination of the upper left audio signal LH and the upper right audio signal RH, and a combination of the outer left audio signal LW and the outer right audio signal RW is included, based on the channel information of input signals included in the multichannel audio data supplied from the audio processing unit 5 (S6, S7, and S11).

If a combination of the outer left audio signal LW and the outer right audio signal RW is included in the multichannel audio data (YES in S6), then the control unit 2 controls the switches to supply the outer left audio signal LW to the outer left SP terminal 14*e* and supply the outer right audio signal RW to the outer right SP terminal 14*f* (S8). Specifically, the control unit 2 controls the switches S11*c*, S11*f*, S13*e*, and S13*f* to be an on state and other switches to be an off state.

If a combination of the upper left audio signal LH and the upper right audio signal RH is included in the multichannel audio data (NO in S6 and YES in S7), then the control unit 2 controls the switches to supply the upper left audio signal LH to the upper left SP terminal 14*c* and supply the upper right audio signal RH to the upper right SP terminal 14*d* (S9). Specifically, the control unit 2 controls the switches S11*b*, S11*e*, S13*c*, and S13*d* to be an on state and other switches to be an off state.

If a combination of the surround back left audio signal SBL and the surround back right audio signal SBR is included in the multichannel audio data (NO in S6, NO in S7, and YES in S11), then the control unit 2 controls the switches to supply the surround back left audio signal SBL to the surround back left SP terminal 14*a* and supply the surround back right audio signal SBR to the surround back right SP terminal 14*b* (S10). Specifically, the control unit 2 controls the switches S11*a*, Slid, S13*a*, and S13*b* to be an on state and other switches to be an off state.

If none of a combination of the outer left audio signal LW and the outer right audio signal RW, a combination of the upper left audio signal LH and the upper right audio signal RH, and a combination of the surround back left audio signal SBL and the surround back right audio signal SBR is included in the multichannel audio data (NO in S11), then the control unit 2 controls the switches not to supply audio signals of all these channels to the SP terminals (S12). Specifically, the control unit 2 controls all the switches to be an off state.

As described above, only with the provision of the two amplifiers 12*a* and 12*b*, by determining channel information included in multichannel audio data to be inputted and switching between the switches, any one of a combination of the surround back left audio signal SBL and the surround back right audio signal SBR, a combination of the outer left audio signal LW and the outer right audio signal RW, and a combination of the upper left audio signal LH and the upper right audio signal RH can be amplified and the amplified signals can be supplied to corresponding SP terminals.

Figure 6:
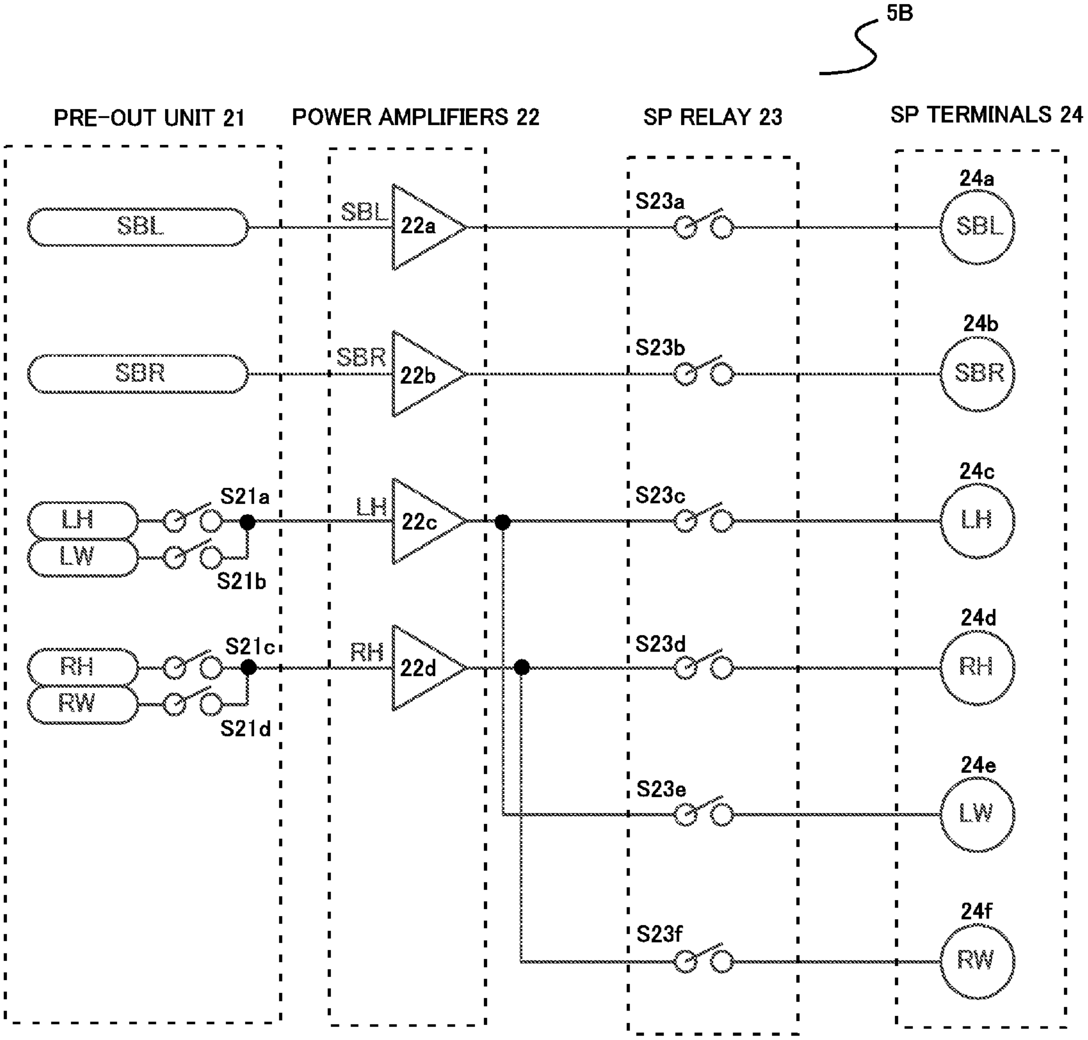
FIG. 6 is a diagram showing an audio processing unit 5B.

Next, an audio processing unit 5B of an AV amplifier according to another preferred embodiment of the present invention will be described with reference to FIG. 6. A pre-out unit 21 includes switches S21*a* to S21*d*. The switch S21*a* switches whether to output an upper left audio signal LH to an amplifier 22*c*. The switch S21*b* switches whether to output an outer left audio signal LW to the amplifier 22*c*. The switch S21*c* switches whether to output an upper right audio signal RH to an amplifier 22*d*. The switch S21*d* switches whether to output an outer right audio signal RW to the amplifier 22*d*.

Power amplifiers 22 include amplifiers 22*a* to 22*d*. The amplifier 22*a* amplifies a surround back left audio signal SBL inputted thereto and supplies the amplified surround back left audio signal SBL to a switch S23*a*. The amplifier 22*b* amplifies a surround back right audio signal SBR inputted thereto and supplies the amplified surround back right audio signal SBR to a switch S23*b*. The amplifier 22*c* amplifies the upper left audio signal LH or the outer left audio signal LW inputted thereto and supplies the amplified audio signal to a switch S23*c* or S23*e*. The amplifier 22*d* amplifies the upper right audio signal RH or the outer right audio signal RW inputted thereto and supplies the amplified audio signal to a switch S23*d* or S23*f*.

An SP relay 23 includes the switches S23*a* to S23*f*. The switch S23*a* switches whether to supply the surround back left audio signal SBL inputted from the amplifier 22*a*, to a surround back left SP terminal 24*a*. The switch S23*c* switches whether to supply the upper left audio signal LH inputted from the amplifier 22*c*, to an upper left SP terminal 24*c*. The switch S23*c* is brought into an on state when the switch S21*a* is in an on state. The switch S23*e* switches whether to supply the outer left audio signal LW inputted from the amplifier 22*c*, to an outer left SP terminal 24*e*. The switch S23*e* is brought into an on state when the switch S21*b* is in an on state.

The switch S23*b* switches whether to supply the surround back right audio signal SBR inputted from the amplifier 22*b*, to a surround back right SP terminal 24*b*. The switch S23*d* switches whether to supply the upper right audio signal RH inputted from the amplifier 22*d*, to an upper right SP terminal 24*d*. The switch S23*d* is brought into an on state when the switch S21*c* is in an on state. The switch S23*f* switches whether to supply the outer right audio signal RW inputted from the amplifier 22*d*, to an outer right SP terminal 24*f*. The switch S23*f* is brought into an on state when the switch S21*d* is in an on state.

Figure 7:
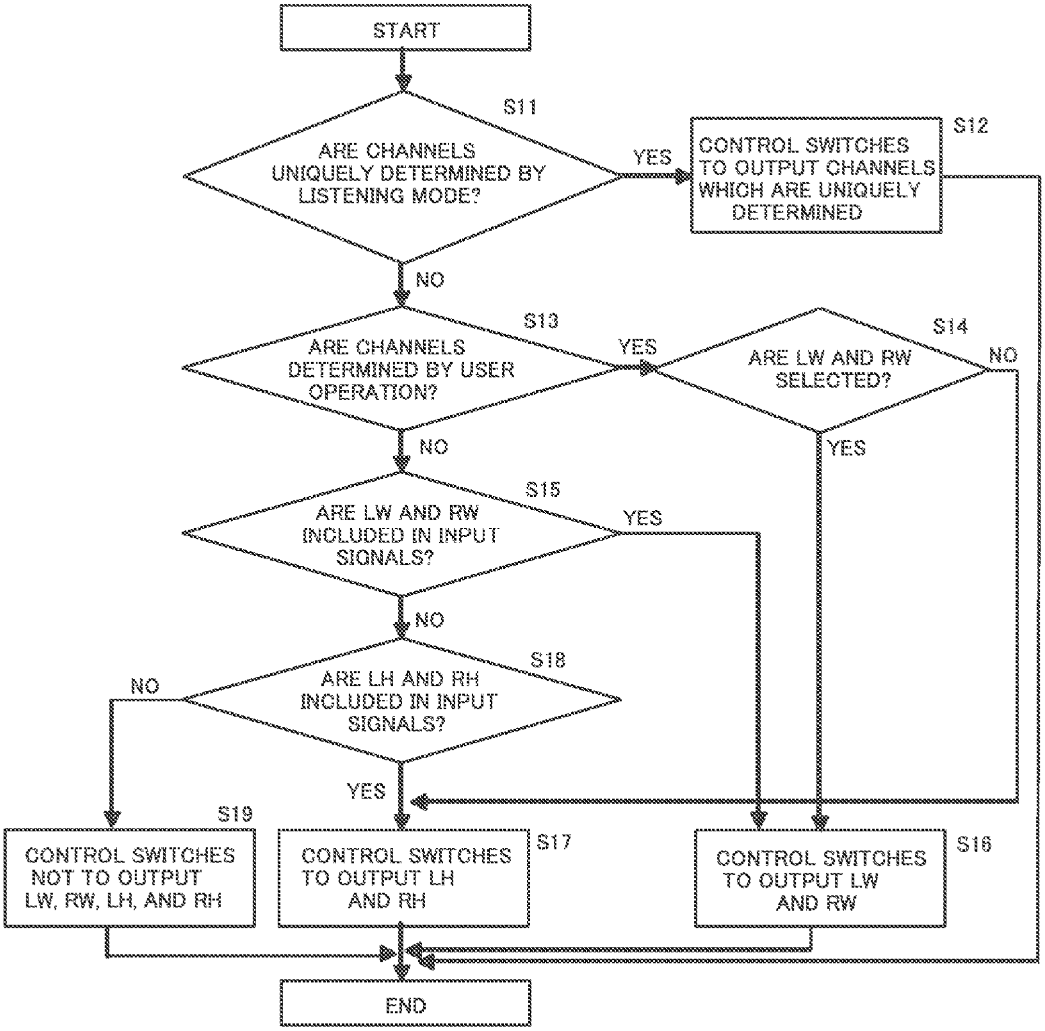
FIG. 7 is a flowchart showing a process performed by the control unit 2.

FIG. 7 is a flowchart showing a process performed by a control unit 2 according to the present example. S11 to S14 are the same as S1 to S5 in FIG. 5 and thus description thereof is omitted.

The control unit 2 determines whether a combination of the outer left audio signal LW and the outer right audio signal RW is included in multichannel audio data (S15). If included (YES in S15), then the control unit 2 controls the switches to supply the outer left audio signal LW to the outer left SP terminal 24*e* and supply the outer right audio signal RW to the outer right SP terminal 24*f* (S16). Specifically, the control unit 2 controls the switches S21*b*, S21*d*, S23*e*, and S23*f* to be an on state and the switches S21*a*, S21*c*, S23*c*, and S23*d* to be an off state.

If determined to be NO in S15, then the control unit 2 determines whether a combination of the upper left audio signal LH and the upper right audio signal RH is included in the multichannel audio data (S18). If included (YES in S18), then the control unit 2 controls the switches to supply the upper left audio signal LH to the upper left SP terminal 24*c* and supply the upper right audio signal RH to the upper right SP terminal 24*d* (S17). Specifically, the control unit 2 controls the switches S21*a*, S21*c*, S23*c*, and S23*d* to be an on state and the switches S21*b*, S21*d*, S23*e*, and S23*f* to be an off state.

If determined to be NO in S18, then the control unit 2 controls the switches not to supply a combination of the outer left audio signal LW and the outer right audio signal RW and a combination of the upper left audio signal LH and the upper right audio signal RH to corresponding SP terminals (S19). Specifically, the control unit 2 controls the switches S21*a* to S21*d* and S23*c* to S23*f* to be an off state.

Figure 8:
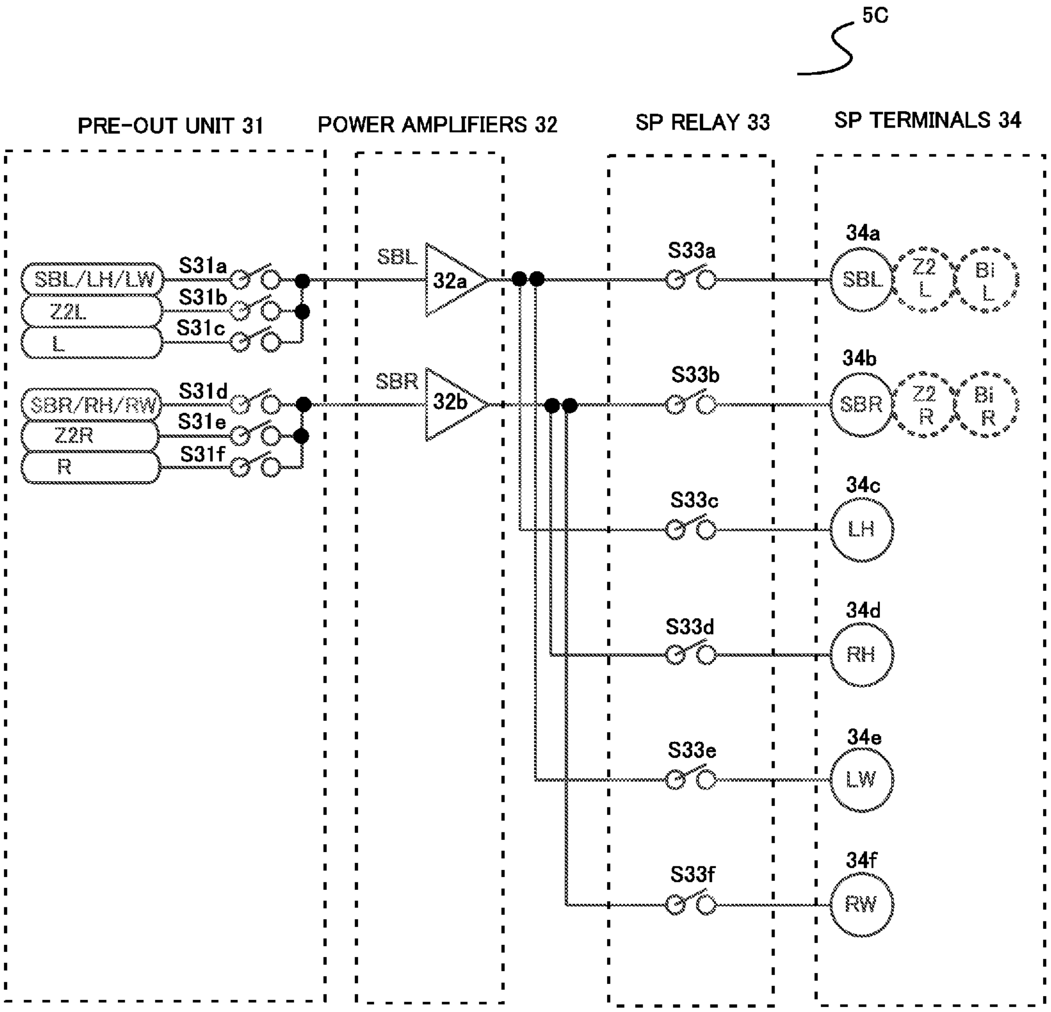
FIG. 8 is a diagram showing an audio processing unit 5C.

Next, an audio processing unit 5C of an AV amplifier according to still another preferred embodiment of the present invention will be described with reference to FIG. 8. The audio processing unit 5C is a variant of the audio processing unit 5 in FIG. 4 and is configured to be able to use Zone2 and Bi-Amp functions.

A pre-out unit 31 includes switches S31*a* to S31*f*. The switch S31*a* switches whether to output any one of a surround back left audio signal SBL, an upper left audio signal LH, and an outer left audio signal LW inputted from a DSP, to an amplifier 32*a*. Specifically, by an instruction from a control unit 2, in the DSP, as a channel to be supplied to the switch S31*a*, any one of the surround back left audio signal SBL, the upper left audio signal LH, and the outer left audio signal LW is selected. The switch S31*b* switches whether to output a Zone2 left audio signal Z2L inputted from the DSP, to the amplifier 32*a*. The switch S31*c* switches whether to output a left audio signal L (for Bi-Amp) inputted from the DSP, to the amplifier 32*a*. Any one of the switches S31*a* to S31*c* is brought into an on state depending on whether to use the Zone2 or Bi-Amp function.

The switch S31*d* switches whether to output any one of a surround back right audio signal SBR, an upper right audio signal RH, and an outer right audio signal RW inputted from the DSP, to an amplifier 32*b*. Specifically, by an instruction from the control unit 2, in the DSP, as a channel to be supplied to the switch S31*d*, any one of the surround back right audio signal SBR, the upper right audio signal RH, and the outer right audio signal RW is selected. The switch S31*e* switches whether to output a Zone2 right audio signal Z2R inputted from the DSP, to the amplifier 32*b*. The switch S31*f* switches whether to output a right audio signal R (for Bi-Amp) inputted from the DSP, to the amplifier 32*b*. Any one of the switches S31*d* to S31*f* is brought into an on state depending on whether to use the Zone2 or Bi-Amp function.

Power amplifiers 32 include the amplifiers 32*a* and 32*b*. The amplifier 32*a* amplifies the surround back left audio signal SBL, the upper left audio signal LH, the outer left audio signal LW, the Zone2 left audio signal Z2L, or the left audio signal L (for Bi-Amp) inputted thereto and supplies the amplified audio signal to a corresponding one of switches S33*a*, S33*c*, and S33*e*. The amplifier 32*b* amplifies the surround back right audio signal SBR, the upper right audio signal RH, the outer right audio signal RW, the Zone2 right audio signal Z2R, or the right audio signal R (for Bi-Amp) inputted thereto and supplies the amplified audio signal to a corresponding one of switches S33*b*, S33*d*, and S33*f*.

An SP relay 33 includes the switches S33*a* to S33*f*. The switch S33*a* switches whether to supply the surround back left audio signal SBL, the Zone2 left audio signal Z2L, or the left audio signal L (for Bi-Amp) inputted from the amplifier 32*a*, to a surround back left SP terminal 34*a*. The switch S33*a* is brought into an on state when the switch S31*a* is in an on state and the surround back left audio signal SBL is supplied to the switch 531*a*, when the switch S31*b* is in an on state, or when the switch S31*c* is in an on state. The switch S33*c* switches whether to supply the upper left audio signal LH inputted from the amplifier 32*a*, to an upper left SP terminal 34*c*. The switch S33*c* is brought into an on state when the switch S31*a* is in an on state and the upper left audio signal LH is supplied to the switch S31*a*. The switch S33*e* switches whether to supply the outer left audio signal LW inputted from the amplifier 32*a*, to an outer left SP terminal 34*e*. The switch S33*e* is brought into an on state when the switch S31*a* is in an on state and the outer left signal LW is supplied to the switch S31*a*.

The switch S33*b* switches whether to supply the surround back right audio signal SBR, the Zone2 right audio signal Z2R, or the right audio signal R (for Bi-Amp) inputted from the amplifier 32*b*, to a surround back right SP terminal 34*b*. The switch S33*b* is brought into an on state when the switch S31*d* is in an on state and the surround back right audio signal SBR is supplied to the switch S31*d*, when the switch S31*e* is in an on state, or when the switch S31*f* is in an on state. The switch S33*d* switches whether to supply the upper right audio signal RH inputted from the amplifier 32*b*, to an upper right SP terminal 34*d*. The switch S33*d* is brought into an on state when the switch S31*d* is in an on state and the upper right audio signal RH is supplied to the switch S31*d*. The switch S33*f* switches whether to supply the outer right audio signal RW inputted from the amplifier 32*b*, to an outer right SP terminal 34*f*. The switch S33*f* is brought into an on state when the switch S31*d* is in an on state and the outer right audio signal RW is supplied to the switch S31*d*.

SP terminals 34 include the SP terminals 34*a* to 34*f*. When the functions are not used, the same speakers as those described above are connected to the SP terminals. When the Zone2 function is used, a Zone2 left speaker SZ2L is connected to the surround back left SP terminal 34*a* and a Zone2 right speaker SZ2R is connected to the surround back right SP terminal 34*b*. When the Bi-Amp function is used, a Bi-Amp terminal of a left speaker SL is connected to the surround back left SP terminal 34*a* and a Bi-Amp terminal of a right speaker SR is connected to the surround back right SP terminal 34*b*.

Next, operations in the present example will be described.

(1) When the Bi-Amp Function is Used

The control unit 2 controls the DSP and the switches to supply the left audio signal L (for Bi-Amp) to the surround back left SP terminal 34*a* and supply the right audio signal R (for Bi-Amp) to the surround back right SP terminal 34*b*. Specifically, the control unit 2 causes the DSP to supply the left audio signal L (for Bi-Amp) to the switch S31*c* and supply the right audio signal R (for Bi-Amp) to the switch S31*f*. The control unit 2 controls the switches S31*c*, S31*f*, S33*a*, and S33*b* to be an on state and other switches to be an off state.

(2) When the Zone2 Function is Used

The control unit 2 controls the DSP and the switches to supply the Zone2 left audio signal Z2L to the surround back left SP terminal 34*a* and supply the Zone2 right audio signal Z2R to the surround back right SP terminal 34*b*. Specifically, the control unit 2 causes the DSP to supply the Zone2 left audio signal Z2L to the switch S31*b* and supply the Zone2 right audio signal Z2R to the switch S31*e*. The control unit 2 controls the switches S31*b*, S31*e*, S33*a*, and S33*b* to be an on state and other switches to be an off state.

(3) When a Combination of the Outer Left Audio Signal LW and the Outer Right Audio Signal RW is Included The control unit 2 controls the DSP and the switches to supply the outer left audio signal LW to the outer left SP terminal 34*e* and supply the outer right audio signal RW to the outer right SP terminal 34*f*. Specifically, the control unit 2 causes the DSP to supply the outer left audio signal LW to the switch S31*a* and supply the outer right audio signal RW to the switch S31*d*. The control unit 2 controls the switches S31*a*, S31*d*, S33*e*, and S33*f* to be an on state and other switches to be an off state.

(4) When a Combination of the Upper Left Audio Signal LH and the Upper Right Audio Signal RH is Included The control unit 2 controls the DSP and the switches to supply the upper left audio signal LH to the upper left SP terminal 34*c* and supply the upper right audio signal RH to the upper right SP terminal 34*d*. Specifically, the control unit 2 causes the DSP to supply the upper left audio signal LH to the switch S31*a* and supply the upper right audio signal RH to the switch S31*d*. The control unit 2 controls the switches S31*a*, S31*d*, S33*c*, and S33*d* to be an on state and other switches to be an off state.

(5) A Combination of the Surround Back Left Audio Signal SBL and the Surround Back Right Audio Signal SBR is Included The control unit 2 controls the DSP and the switches to supply the surround back left audio signal SBL to the surround back left SP terminal 34*a* and supply the surround back right audio signal SBR to the surround back right SP terminal 34*b*. Specifically, the control unit 2 causes the DSP to supply the surround back left audio signal SBL to the switch S31*a* and supply the surround back right audio signal SBR to the switch S31*d*. The control unit 2 controls the switches S31*a*, S31*d*, S33*a*, and S33*b* to be an on state and other switches to be an off state.

Next, an audio processing unit 5D of an AV amplifier according to yet another preferred embodiment of the present invention will be described with reference to FIG. 9. The audio processing unit 5D is a variant of the audio processing unit 5B in FIG. 6 and is configured to allow Zone2, Zone3, Bi-Amp, BTL, speaker B, and passive sub-woofer output functions to be applicable thereto.

A pre-out unit 41 includes switches S41*a* to S41*n*. The switch S41*a* switches whether to output a surround back left audio signal SBL inputted from a DSP, to an amplifier 42*a*. The switch S41*b* switches whether to output a Zone3 left audio signal Z3L inputted from the DSP, to the amplifier 42*a*. The switch S41*c* switches whether to output a left audio signal L (for Bi-Amp) inputted from the DSP, to the amplifier 42*a*. The switch S41*d* switches whether to output a BTL left audio signal L− to the amplifier 42*a*. Any one of the switches S41*a* to S41*d* is brought into an on state depending on whether to use the functions.

The switch S41*e* switches whether to output a surround back right audio signal SBR inputted from the DSP, to an amplifier 42*b*. The switch S41*f* switches whether to output a Zone3 right audio signal Z3R inputted from the DSP, to the amplifier 42*b*. The switch 541*g* switches whether to output a right audio signal R (for Bi-Amp) inputted from the DSP, to the amplifier 42*b*. The switch S41*h* switches whether to output a BTL right audio signal R− to the amplifier 42*b*. Any one of the switches S41*e* to S41*h* is brought into an on state depending on whether to use the functions.

The switch S41*i* switches whether to output an upper left audio signal LH or an outer left audio signal LW inputted from the DSP, to an amplifier 42*c*. Specifically, in the DSP, as a channel to be supplied to the switch S41*i*, one of the upper left audio signal LH and the outer left audio signal LW is selected. The switch S41*j* switches whether to output a low-frequency audio signal SW inputted from the DSP, to the amplifier 42*c*. The switch S41*k* switches whether to output a Zone2 left audio signal Z2L inputted from the DSP, to the amplifier 42*c*. Any one of the switches S41*i* to S41*k* is brought into an on state depending on whether to use the functions.

The switch S41*l* switches whether to output an upper right audio signal RH or an outer right audio signal RW inputted from the DSP, to an amplifier 42*d*. Specifically, in the DSP, as a channel to be supplied to the S41*l*, one of the upper right audio signal RH and the outer right audio signal RW is selected. The switch S41*m* switches whether to output a low-frequency audio signal SW inputted from the DSP, to the amplifier 42*d*. The switch S41*n* switches whether to output a Zone2 right audio signal Z2R inputted from the DSP, to the amplifier 42*d*. Any one of the switches S41*l* to 41*n* is brought into an on state depending on whether to use the functions.

Power amplifiers 42 include the amplifiers 42*a* to 42*d*. The amplifier 42*a* amplifies the surround back left audio signal SBL, the Zone3 left audio signal Z3L, the left audio signal L (for Bi-Amp), or the BTL left audio signal L− inputted thereto and supplies the amplified audio signal to a switch S43*a*. The amplifier 42*b* amplifies the surround back right audio signal SBR, the Zone3 right audio signal Z3R, the right audio signal R (for Bi-Amp), or the BTL right audio signal R− inputted thereto and supplies the amplified audio signal to a switch S43*b*. The amplifier 42*c* amplifies the upper left audio signal LH, the outer left audio signal LW, the low-frequency audio signal SW, or the Zone2 left audio signal Z2L inputted thereto and supplies the amplified audio signal to a switch S43*c*. The amplifier 42*d* amplifies the upper right audio signal RH, the outer right audio signal RW, the low-frequency audio signal SW, or the Zone2 right audio signal Z2R inputted thereto and supplies the amplified audio signal to a switch S43*d*. An amplifier 42*e* is an amplifier for a left audio signal L, amplifies the left audio signal L supplied from the DSP, and supplies the amplified left audio signal L to a switch S43*f*. An amplifier 42*f* is an amplifier for a right audio signal R, amplifies the right audio signal R supplied from the DSP, and supplies the amplified right audio signal R to a switch S43*h*.

An SP relay 43 includes the switches S43*a* to S43*h*. The switch S43*a* switches whether to supply the surround back left audio signal SBL, the Zone3 left audio signal Z3L, the left audio signal L (for Bi-Amp), or the BTL left audio signal L− inputted from the amplifier 42*a*, to a surround back left SP terminal 44*a*. The switch S43*a* goes to an on state when any one of the switches S41*a* to S41*d* is in an on state. The switch S43*b* switches whether to supply the surround back right audio signal SBR, the Zone3 right audio signal Z3R, the right audio signal R (for Bi-Amp), or the BTL right audio signal R− inputted from the amplifier 42*b*, to a surround back right SP terminal 44*b*. The switch S43*b* goes to an on state when any one of the switches S41*e* to S41*h* is in an on state.

The switch S43*c* switches whether to supply the upper left audio signal LH or the low-frequency audio signal SW inputted from the amplifier 42*c*, to an upper left SP terminal 44*c*. The switch S43*c* is brought into an on state when the switch S41*i* is in an on state and the upper left audio signal LH is supplied to the switch S41*i* or when the switch S41*j* is in an on state. The switch S43*d* switches whether to supply the upper right audio signal RH or the low-frequency audio signal SW inputted from the amplifier 42*d*, to an upper right SP terminal 44*d*. The switch S43*d* is brought into an on state when the switch S41*l* is in an on state and the upper right audio signal RH is supplied to the switch S41*l* or when the switch S41*m* is in an on state.

A switch S43*e* switches whether to supply the outer left audio signal LW or the Zone2 left audio signal Z2L inputted from the amplifier 42*c*, to an outer left SP terminal 44*e*. The switch S43*e* is brought into an on state when the switch S41*i* is in an on state and the outer left audio signal LW is supplied to the switch S41*i* or when the switch S41*k* is in an on state. A switch S43*g* switches whether to supply the outer right audio signal RW or the Zone2 right audio signal Z2R inputted from the amplifier 42*d*, to an outer right SP terminal 44*f*. The switch S43*g* is brought into an on state when the switch S41*l* is in an on state and the outer right audio signal RW is supplied to the switch S41*l* or when the switch S41*n* is in an on state.

The switch S43*f* switches whether to supply the left audio signal L (for speaker B) inputted from the amplifier 42*e*, to the outer left SP terminal 44*e*. The switch S43*h* switches whether to supply the right audio signal R (for speaker B) inputted from the amplifier 42*f*, to the outer right SP terminal 44*f*.

SP terminals 44 include the SP terminals 44*a* to 44*f*. When the functions are not used, the same speakers as those described above are connected to the SP terminals. When the Zone3 function is used, a Zone3 left speaker SZ3L is connected to the surround back left SP terminal 44*a* and a Zone3 right speaker SZ3R is connected to the surround back right SP terminal 44*b*. When the Bi-Amp function is used, a Bi-Amp terminal of a left speaker SL is connected to the surround back left SP terminal 44*a* and a Bi-Amp terminal of a right speaker SR is connected to the surround back right SP terminal 44*b*. When the BTL function is used, a − side of the left speaker SL is connected to the surround back left SP terminal 44*a* and a − side of the right speaker SR is connected to the surround back right SP terminal 44*b*. When the passive sub-woofer output function is used, a passive sub-woofer (a speaker dedicated to low frequencies, which is not built in the amplifier) is connected to the upper left SP terminal 44*c* and the upper right SP terminal 44*d*. When the Zone2 function is used, a Zone2 left speaker SZ2L is connected to the outer left SP terminal 44*e* and a Zone2 right speaker SZ2R is connected to the outer right SP terminal 44*f*. When the speaker B function is used, a speaker B left speaker SLB is connected to the outer left SP terminal 44*e* and a speaker B right speaker SRB is connected to the outer right SP terminal 44*f*.

Next, operations in the present example will be described.

(1) When the Bi-Amp Function is Used

A control unit 2 controls the DSP and the switches to supply the left audio signal L (for Bi-Amp) to the surround back left SP terminal 44*a* and supply the right audio signal R (for Bi-Amp) to the surround back right SP terminal 44*b*. Specifically, the control unit 2 causes the DSP to supply the left audio signal L (for Bi-Amp) to the switch S41*c* and supply the right audio signal R (for Bi-Amp) to the switch S41*g*. The control unit 2 controls the switches S41*c*, S41*g*, S43*a*, and S43*b* to be an on state and the switches S41*a*, S41*b*, S41*d*, S41*e*, S41*f*, and S41*h* to be an off state.

(2) When the BTL Function is Used

The control unit 2 controls the DSP and the switches to supply the BTL left audio signal L− to the surround back left SP terminal 44*a* and supply the BTL right audio signal R− to the surround back right SP terminal 44*b*. Specifically, the control unit 2 causes the DSP to supply the BTL left audio signal L− to the switch S41*d* and supply the BTL right audio signal R− to the switch S41*h*. The control unit 2 controls the switches S41*d*, S41*h*, S43*a*, and S43*b* to be an on state and the switches S41*a*, S41*b*, S41*c*, S41*e*, S41*f*, and S41*g* to be an off state.

(3) When the Speaker B Function is Used

The control unit 2 controls the DSP and the switches to supply the left audio signal L to the outer left SP terminal 44*e* and supply the right audio signal R to the outer right SP terminal 44*f*. Specifically, the control unit 2 controls the switches S43*f* and S43*h* to be an on state and the switches S41*i* to S41*n*, S43*c*, S43*d*, S43*e*, and S43*g* to be an off state.

(4) When the Passive Sub-Woofer Output Function is Used

The control unit 2 controls the DSP and the switches to supply the low-frequency audio signal SW to the upper left SP terminal 44*c* and the upper right SP terminal 44*d*. Specifically, the control unit 2 causes the DSP to supply the low-frequency audio signal SW to the switches S41*j* and S41*m*. The control unit 2 controls the switches S41*j*, S41*m*, S43*c*, and S43*d* to be an on state and the switches S41*i*, S41*k*, S41*l*, S41*n*, S43*e*, S43*f*, S43*g*, and S43*h* to be an off state.

(5) When the Zone2 Function is Used

The control unit 2 controls the DSP and the switches to supply the Zone2 left audio signal Z2L to the outer left SP terminal 44*e* and supply the Zone2 right audio signal Z2R to the outer right SP terminal 44*f*. Specifically, the control unit 2 causes the DSP to supply the Zone2 left audio signal Z2L to the switch S41*k* and supply the Zone2 right audio signal Z2R to the switch S41*n*. The control unit 2 controls the switches S41*k*, S41*n*, S43*e*, and S43*g* to be an on state and the switches S41*i*, S41*j*, S41*l*, S41*m*, S43*c*, S43*d*, S43*f*, and S43*g* to be an off state.

(6) When the Zone3 Function is Used

The control unit 2 controls the DSP and the switches to supply the Zone3 left audio signal Z3L to the surround back left SP terminal 44*a* and supply the Zone3 right audio signal Z3R to the surround back right SP terminal 44*b*. Specifically, the control unit 2 causes the DSP to supply the Zone3 left audio signal Z3L to the switch 541*b* and supply the Zone3 right audio signal Z3R to the switch S41*f*. The control unit 2 controls the switches S41*b*, S41*f*, S43*a*, and S43*b* to be an on state and the switches S41*a*, S41*c*, S41*d*, S41*e*, S41*g*, and S41*h* to be an off state.

(7) When a Combination of the Outer Left Audio Signal LW and the Outer Right Audio Signal RW is Included The control unit 2 controls the DSP and the switches to supply the outer left audio signal LW to the outer left SP terminal 44*e* and supply the outer right audio signal RW to the outer right SP terminal 44*f*. Specifically, the control unit 2 causes the DSP to supply the outer left audio signal LW to the switch S41*i* and supply the outer right audio signal RW to the switch S41*l*. The control unit 2 controls the switches S41*i*, S41*l*, S43*e*, and S43*g* to be an on state and the switches S41*j*, S41*k*, S41*m*, S41*n*, S43*c*, S43*d*, S43*f*, and S43*h* to be an off state.

(8) When a Combination of the Upper Left Audio Signal LH and the Upper Right Audio Signal RH is Included The control unit 2 controls the DSP and the switches to supply the upper left audio signal LH to the upper left SP terminal 44*c* and supply the upper right audio signal RH to the upper right SP terminal 44*d*. Specifically, the control unit 2 causes the DSP to supply the upper left audio signal LH to the switch S41*i* and supply the upper right audio signal RH to the switch S41*l*. The control unit 2 controls the switches S41*i*, S41*l*, S43*c*, and S43*d* to be an on state and the switches S41*j*, S41*k*, S41*m*, S41*n*, S43*e*, S43*f*, S43*g*, and S43*h* to be an off state.

(9) When a Combination of the Surround Back Left Audio Signal SBL and the Surround Back Right Audio Signal SBR is Included The control unit 2 controls the DSP and the switches to supply the surround back left audio signal SBL to the surround back left SP terminal 44*a* and supply the surround back right audio signal SBR to the surround back right SP terminal 44*b*. Specifically, the control unit 2 causes the DSP to supply the surround back left audio signal SBL to the switch S41*a* and supply the surround back right audio signal SBR to the switch S41*e*. The control unit 2 controls the switches S41*a*, S41*e*, S43*a*, and S43*b* to be an on state and the switches S41*b*, S41*c*, S41*d*, S41*f*, S41*g*, and S41*h* to be an off state.

Next, an audio processing unit 5E of an AV amplifier according to yet another preferred embodiment of the present invention will be described with reference to FIG. 10. The audio processing unit 5E is a variant of the audio processing unit 5D in FIG. 9. A left audio signal L (for Bi-Amp) is outputted from the upper left SP terminal 44*c* and a right audio signal R (for Bi-Amp) is outputted from the upper right SP terminal 44*d*. In this case, the Bi-Amp function is able to be used in the state that the surround back left audio signal SBL is outputted from the surround back left SP terminal 44*a* and the surround back right audio signal SBR is outputted from the surround back right SP terminal 44*b*. Namely in this case, the left audio signal L and the right audio signal R are able to be reproduced by using the Bi-Amp function in the state that the basic 7.1 channels (a left audio signal L, a right audio signal R, a center audio signal C, a low-frequency audio signal SW, a surround left audio signal SL, a surround right audio signal SR, a surround back left audio signal SBL and a surround back right audio signal SBR) are reproduced.

The switch S41*c* switches whether to output a left audio signal L (for Bi-Amp) inputted from the DSP, to the amplifier 42*c*. The switch S41*g* switches whether to output a right audio signal R (for Bi-Amp) inputted from the DSP, to the amplifier 42*d*.

The amplifier 42*c* amplifies the upper left audio signal LH, the outer left audio signal LW, the low-frequency audio signal SW, the Zone2 left audio signal Z2L, or the left audio signal L (for Bi-Amp) inputted thereto and supplies the amplified audio signal to a switch S43*c* or S43*e*. The amplifier 42*d* amplifies the upper right audio signal RH, the outer right audio signal RW, the low-frequency audio signal SW, the Zone2 right audio signal Z2R, or the right audio signal R (for Bi-Amp) inputted thereto and supplies the amplified audio signal to a switch S43*d* or S43*g*.

The switch S43*c* switches whether to supply the upper left audio signal LH, the low-frequency audio signal SW, or the left audio signal L (for Bi-Amp) inputted from the amplifier 42*c*, to an upper left SP terminal 44*c*. The switch S43*c* is brought into an on state when the switch S41*i* is in an on state and the upper left audio signal LH is supplied to the switch S41*i*, when the switch S41*j* is in an on state, or when the switch S41*c* is in an on state. The switch S43*d* switches whether to supply the upper right audio signal RH, the low-frequency audio signal SW, or the right audio signal R (for Bi-Amp) inputted from the amplifier 42*d*, to an upper right SP terminal 44*d*. The switch S43*d* is brought into an on state when the switch S41*l* is in an on state and the upper right audio signal RH is supplied to the switch S41*l*, when the switch S41*m* is in an on state, or when the switch S41*g* is in an on state.

For Bi-Amp function, the left SP terminal of the AV amplifier is connected to a woofer terminal of the left speaker SL and the upper left SP terminal 44*c* is connected to a tweeter terminal of the left speaker SL. The right SP terminal of the AV amplifier is connected to a woofer terminal of the right speaker SR and the upper right SP terminal 44*d* is connected to a tweeter terminal of the right speaker SR.

(1) When the Bi-Amp Function is Used

A control unit 2 controls the DSP and the switches to supply the left audio signal L (for Bi-Amp) to the upper left SP terminal 44*c* via the amplifier 42*c* and supply the right audio signal R (for Bi-Amp) to the upper right SP terminal 44*d* via the amplifier 42*d*. Specifically, the control unit 2 causes the DSP to supply the left audio signal L (for Bi-Amp) to the switch S41*c* and supply the right audio signal R (for Bi-Amp) to the switch S41*g*. The control unit 2 controls the switches S41*c*, S41*g*, S43*c*, and S43*d* to be an on state and the switches S41*i*, S41*j*, S41*k*, S41*l*, S41*m*, S41*n*, S43*e* and S43*g* to be an off state.

Figure 9:
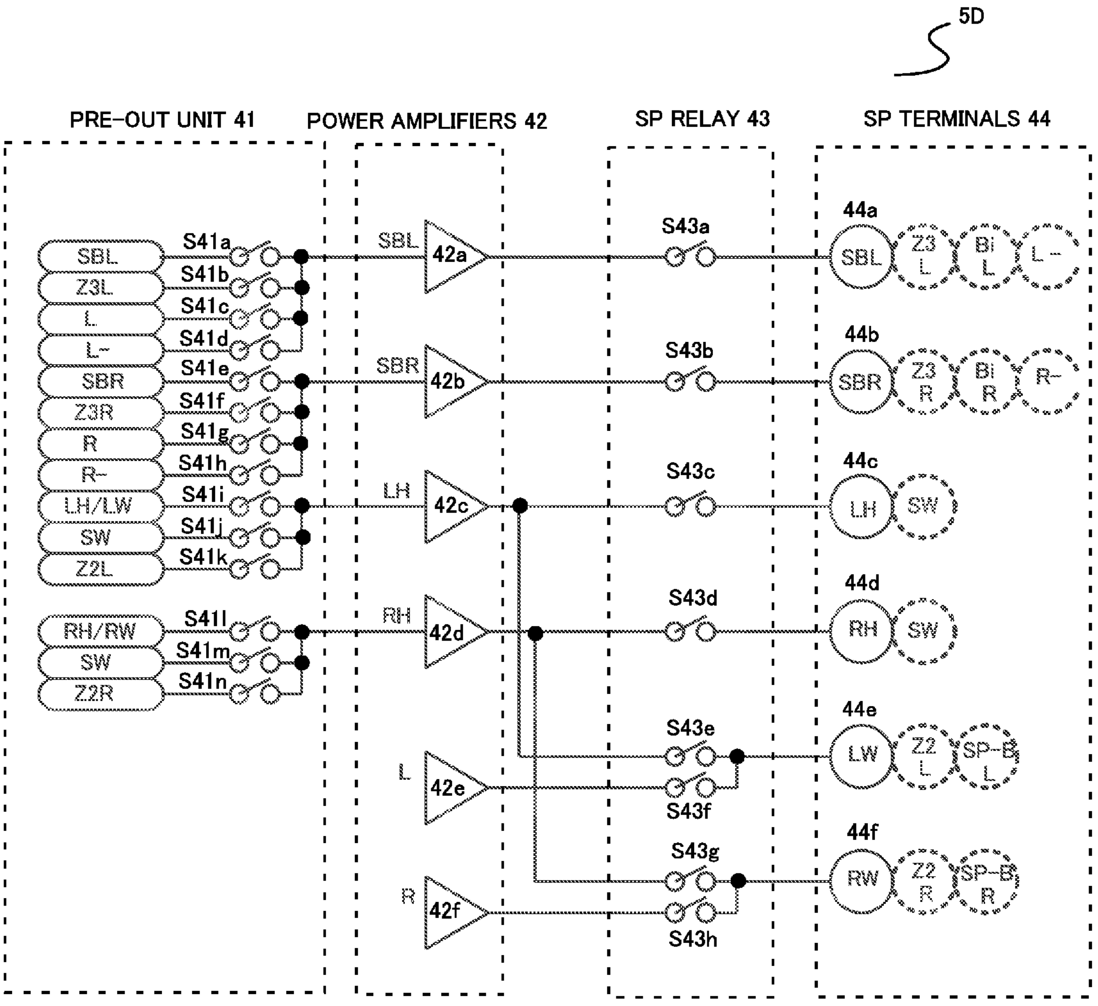
FIG. 9 is a diagram showing an audio processing unit 5D.

The other case is similar to the audio processing unit 5D in FIG. 9. Specifically, when the Bi-Amp function is not used, for example, the control unit 2 controls the DSP and the switches so that the upper left audio signal LH is supplied to the upper left SP terminal 44*c* via the amplifier 42*c* and so that the upper right audio signal RH is supplied to the upper right SP terminal 44*d* via the amplifier 42*d*.

Next, an audio processing unit 5F of an AV amplifier according to yet another preferred embodiment of the present invention will be described with reference to FIG. 11. The audio processing unit 5F is a variant of the audio processing unit 5E in FIG. 10. A left audio signal L (for Bi-Amp) is outputted from the outer left SP terminal 44*e* and a right audio signal R (for Bi-Amp) is outputted from the outer right SP terminal 44*f*. In this case, the Bi-Amp function is able to be used in the state that the surround back left audio signal SBL is outputted from the surround back left SP terminal 44*a* and the surround back right audio signal SBR is outputted from the surround back right SP terminal 44*b*. Namely in this case, the left audio signal L and the right audio signal R are able to be reproduced by using the Bi-Amp function in the state that the basic 7.1 channels (a left audio signal L, a right audio signal R, a center audio signal C, a low-frequency audio signal SW, a surround left audio signal SL, a surround right audio signal SR, a surround back left audio signal SBL and a surround back right audio signal SBR) are reproduced.

A switch S43*e* switches whether to supply the outer left audio signal LW, the Zone2 left audio signal Z2L, or the left audio signal L (for Bi-Amp) inputted from the amplifier 42*c*, to the outer left SP terminal 44*e*. The switch S43*e* is brought into an on state when the switch S41*i* is in an on state and the outer left audio signal LW is supplied to the switch S41*i*, when the switch S41*k* is in an on state, or when the switch S41*c* is in an on state. A switch S43*g* switches whether to supply the outer right audio signal RW, the Zone2 right audio signal Z2R, or the right audio signal R (for Bi-Amp) inputted from the amplifier 42*d*, to the outer right SP terminal 44*f*. The switch S43*g* is brought into an on state when the switch S41*l* is in an on state and the outer right audio signal RW is supplied to the switch S41*l*, when the switch S41*n* is in an on state, or when the switch S41*g* is in an on state.

For Bi-Amp function, the left SP terminal of the AV amplifier is connected to a woofer terminal of the left speaker SL and the outer left SP terminal 44*e* is connected to a tweeter terminal of the left speaker SL. The right SP terminal of the AV amplifier is connected to a woofer terminal of the right speaker SR and the outer right SP terminal 44*f* is connected to a tweeter terminal of the right speaker SR.

(1) When the Bi-Amp Function is Used

A control unit 2 controls the DSP and the switches to supply the left audio signal L (for Bi-Amp) to the outer left SP terminal 44*e* via the amplifier 42*c* and supply the right audio signal R (for Bi-Amp) to the outer right SP terminal 44*f* via the amplifier 42*d*. Specifically, the control unit 2 causes the DSP to supply the left audio signal L (for Bi-Amp) to the switch S41*c* and supply the right audio signal R (for Bi-Amp) to the switch S41*g*. The control unit 2 controls the switches S41*c*, S41*g*, S43*e*, and S43*g* to be an on state and the switches S41*i*, S41*j*, S41*k*, S41*l*, S41*m*, S41*n*, S43*c*, S43*d*, S43*f* and S43*h* to be an off state.

Figure 10:
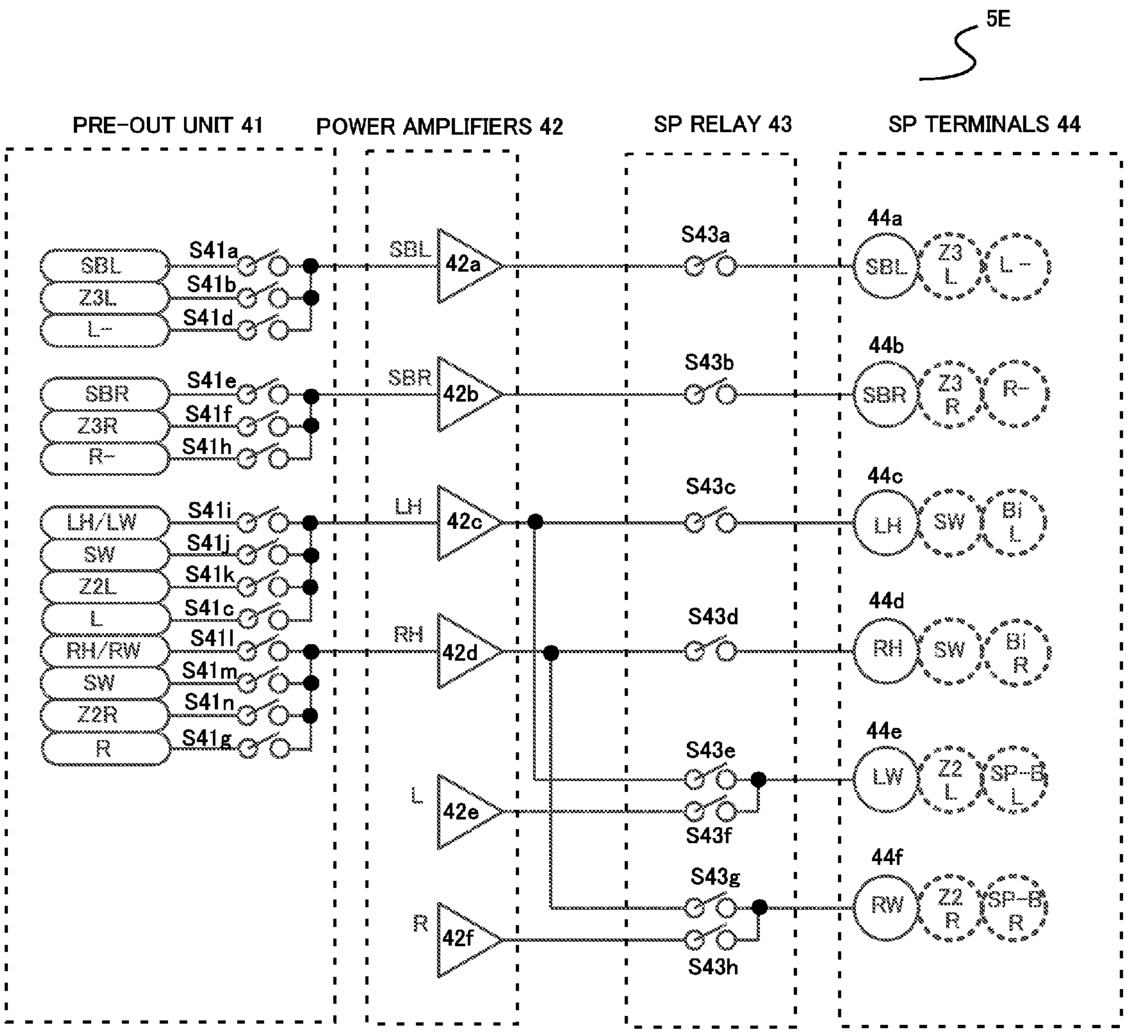
FIG. 10 is a diagram showing an audio processing unit 5E.
Figure 11:
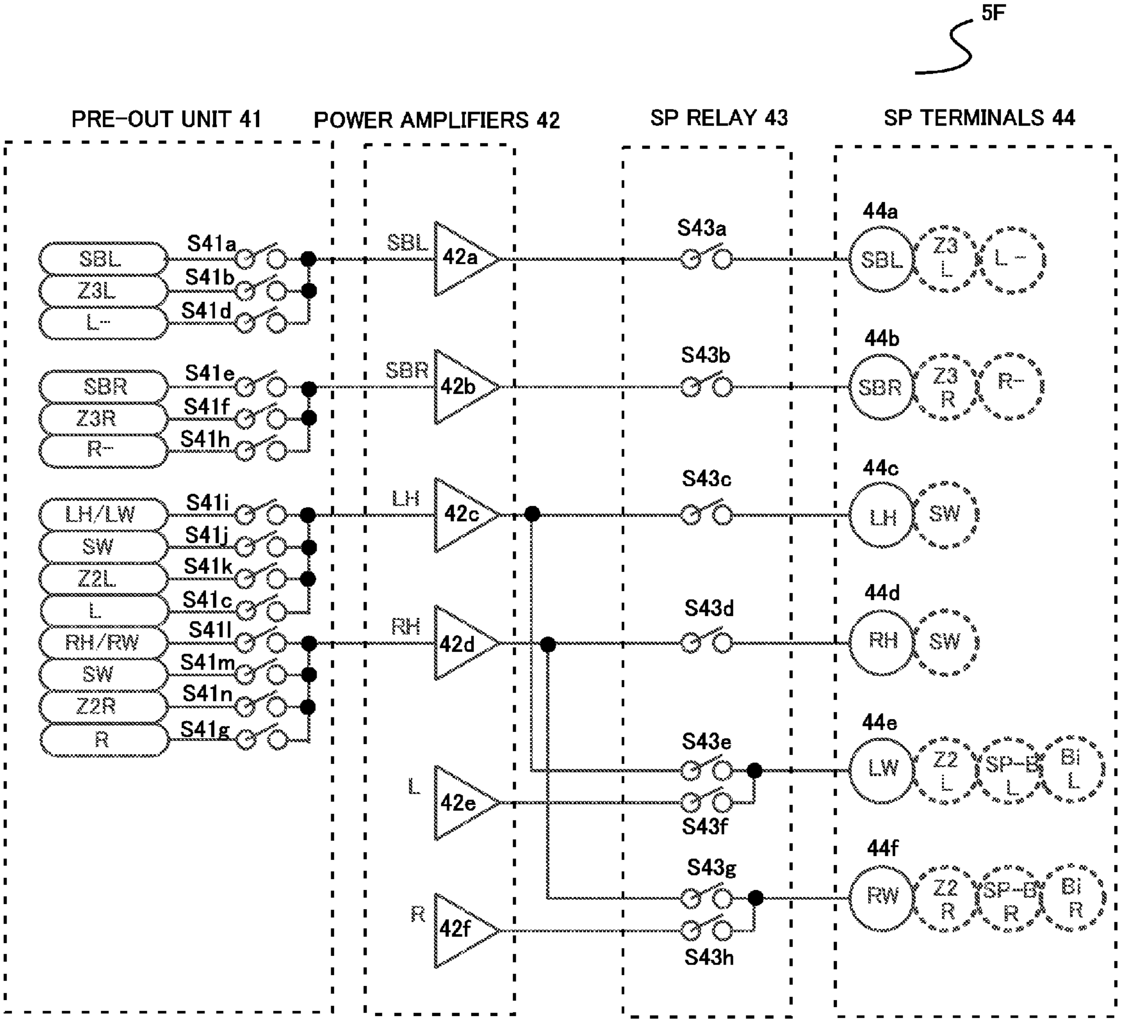
FIG. 11 is a diagram showing an audio processing unit 5F.

The other case is similar to the audio processing unit 5E in FIG. 10. Specifically, when the Bi-Amp function is not used, for example, the control unit 2 controls the DSP and the switches so that the outer left audio signal LW is supplied to the outer left SP terminal 44*e* via the amplifier 42*c* and so that the outer right audio signal RW is supplied to the outer right SP terminal 44*f* via the amplifier 42*d*.

Figure 12:
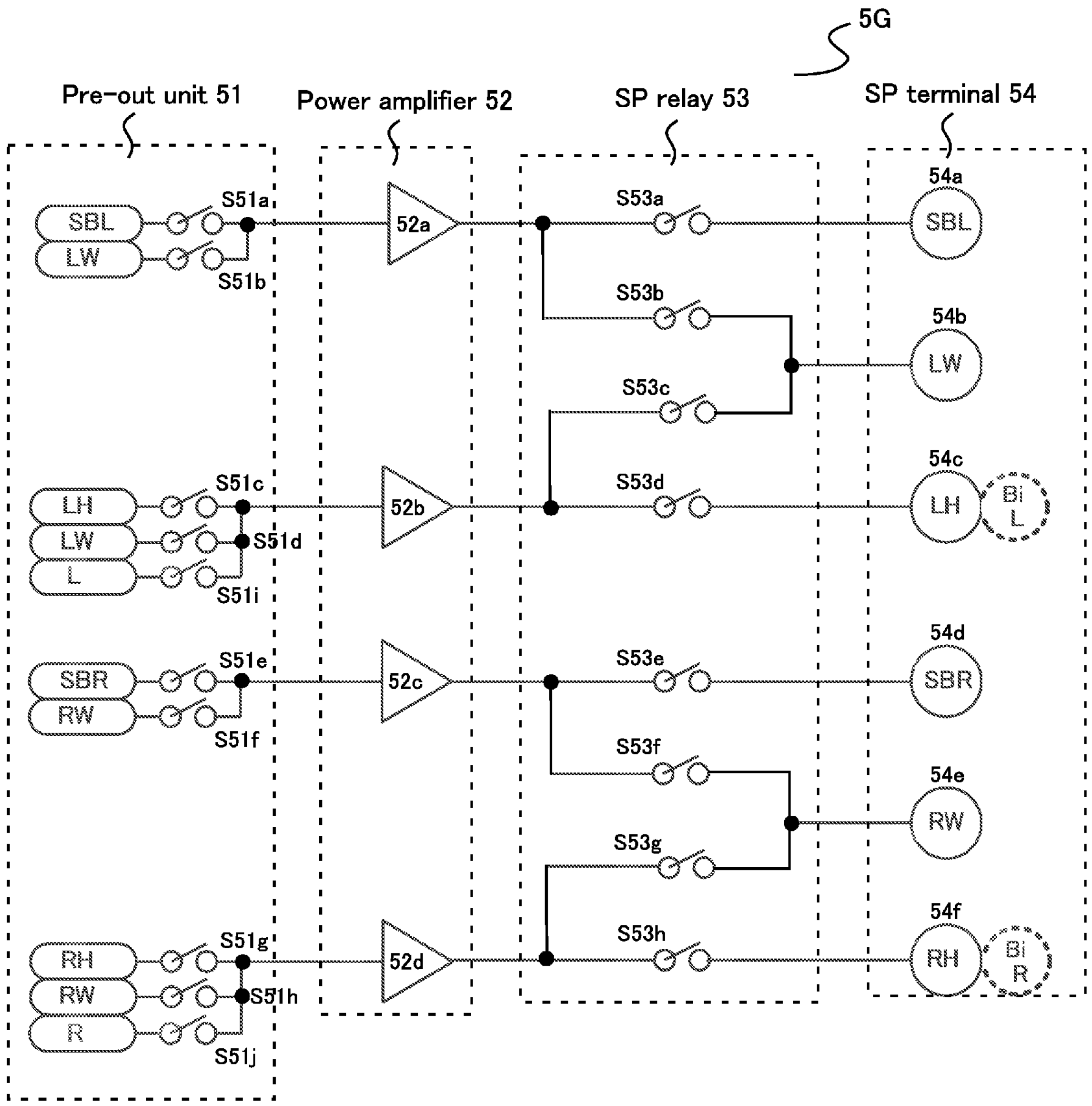
FIG. 12 is a diagram showing an audio processing unit 5G.

Next, an audio processing unit 5G of an AV amplifier according to yet another preferred embodiment of the present invention will be described with reference to FIG. 12.

The switch S51*a* performs switching as to whether or not the surround back left audio signal SBL is to be outputted to an amplifier 52*a*. The switch S51*b* performs switching as to whether or not the outer left audio signal LW is to be outputted to the amplifier 52*a*. The switch S51*c* performs switching as to whether or not the upper left audio signal LH is to be outputted to an amplifier 52*b*. The switch S51*d* performs switching as to whether or not the outer left audio signal LW is to be outputted to the amplifier 52*b*. The switch S51*i* performs switching as to whether or not the left audio signal L (for Bi-Amp) is to be outputted to the amplifier 52*b*.

The switch S51*e* performs switching as to whether or not the surround back right audio signal SBR is to be outputted to an amplifier 52*c*. The switch S51*f* performs switching as to whether or not the outer right audio signal RW is to be outputted to the amplifier 52*c*. The switch S51*g* performs switching as to whether or not the upper right audio signal RH is to be outputted to an amplifier 52*d*. The switch S51*h* performs switching as to whether or not the outer right audio signal RW is to be outputted to the amplifier 52*d*. The switch S51*j* performs switching as to whether or not the right audio signal R (for Bi-Amp) is to be outputted to the amplifier 52*d*.

The amplifier 52*a* amplifies the surround back left audio signal SBL or the outer left audio signal LW supplied from the pre-out unit 51 to supply to the SP relay 53 (switches S53*a*, S53*b*). The amplifier 52*b* amplifies the upper left audio signal LH, the outer left audio signal LW, or the left audio signal L (for Bi-Amp) supplied from the pre-out unit 51 to supply to the SP relay 53 (switches S53*c*, S53*d*). The amplifier 52*c* amplifies the surround back right audio signal SBR or the outer right audio signal RW supplied from the pre-out unit 51 to supply to the SP relay 53 (switches S53*e*, S53*f*). The amplifier 52*d* amplifies the upper right audio signal RH, the outer right audio signal RW, or the right audio signal R (for Bi-Amp) supplied from the pre-out unit 51 to supply to the SP relay 53 (switches S53*g*, S53*h*).

The switch S53*a* performs switching as to whether or not the surround back left audio signal SBL supplied from the amplifier 52*a* is to be supplied to a surround back left SP terminal 54*a*.

The switch S53*b* performs switching as to whether or not the outer left audio signal LW supplied from the amplifier 52*a* is to be supplied to an outer left SP terminal 54*b*. The switch S53*c* performs switching as to whether or not the outer left audio signal LW supplied from the amplifier 52*b* is to be supplied to the outer left SP terminal 54*b*. The switch S53*d* performs switching as to whether or not the upper left audio signal LH or the left audio signal L (for Bi-Amp) supplied from the amplifier 52*b* is to be supplied to a upper left SP terminal 54*c*.

The switch S53*e* performs switching as to whether or not the surround back right audio signal SBR supplied from the amplifier 52*c* is to be supplied to a surround back right SP terminal 54*d*. The switch S53*f* performs switching as to whether or not the outer right audio signal RW supplied from the amplifier 52*c* is to be supplied to an outer right SP terminal 54*e*. The switch S53*g* performs switching as to whether or not the outer right audio signal RW supplied from the amplifier 52*d* is to be supplied to the outer right SP terminal 54*e*. The switch S53*h* performs switching as to whether or not the upper right audio signal RH, or the right audio signal R (for Bi-Amp) supplied from the amplifier 52*d* is to be supplied to an upper right SP terminal 54*f*.

For Bi-Amp function, the left SP terminal of the AV amplifier is connected to a woofer terminal of the left speaker SL and the upper left SP terminal 54*c* is connected to a tweeter terminal of the left speaker SL. The right SP terminal of the AV amplifier is connected to a woofer terminal of the right speaker SR and the upper right SP terminal 54*f* is connected to a tweeter terminal of the right speaker SR.

(1) When the Bi-Amp Function is Used

A control unit 2 controls the DSP and the switches to supply the left audio signal L (for Bi-Amp) to the upper left SP terminal 54*c* and supply the right audio signal R (for Bi-Amp) to the upper right SP terminal 54*f*. Specifically, the control unit 2 causes the DSP to supply the left audio signal L (for Bi-Amp) to the switch S51*i* and supply the right audio signal R (for Bi-Amp) to the switch S51*j*. The control unit 2 controls the switches S51*i*, S51*j*, S53*d*, and S53*h* to be an on state and the switches S51*c*, S51*d*, S51*g*, S51*h*, S53*c* and S53*g* to be an off state.

In this case, the Bi-Amp function is able to be used in the state that the surround back left audio signal SBL is output from the surround back left SP terminal 54*a* and the surround back right audio signal SBR is output from the surround back right SP terminal 54*d*. Specifically, the control unit 2 causes the DSP to supply the surround back left audio signal SBL to the switch 551*a* and supply the surround back right audio signal SBR to the switch S51*e*. The control unit 2 controls the switches S51*a*, S51*e*, S53*a*, and S53*e* to be an on state and the switches S51*b*, S51*f*, S53*b* and S53*f* to be an off state.

Figure 13:
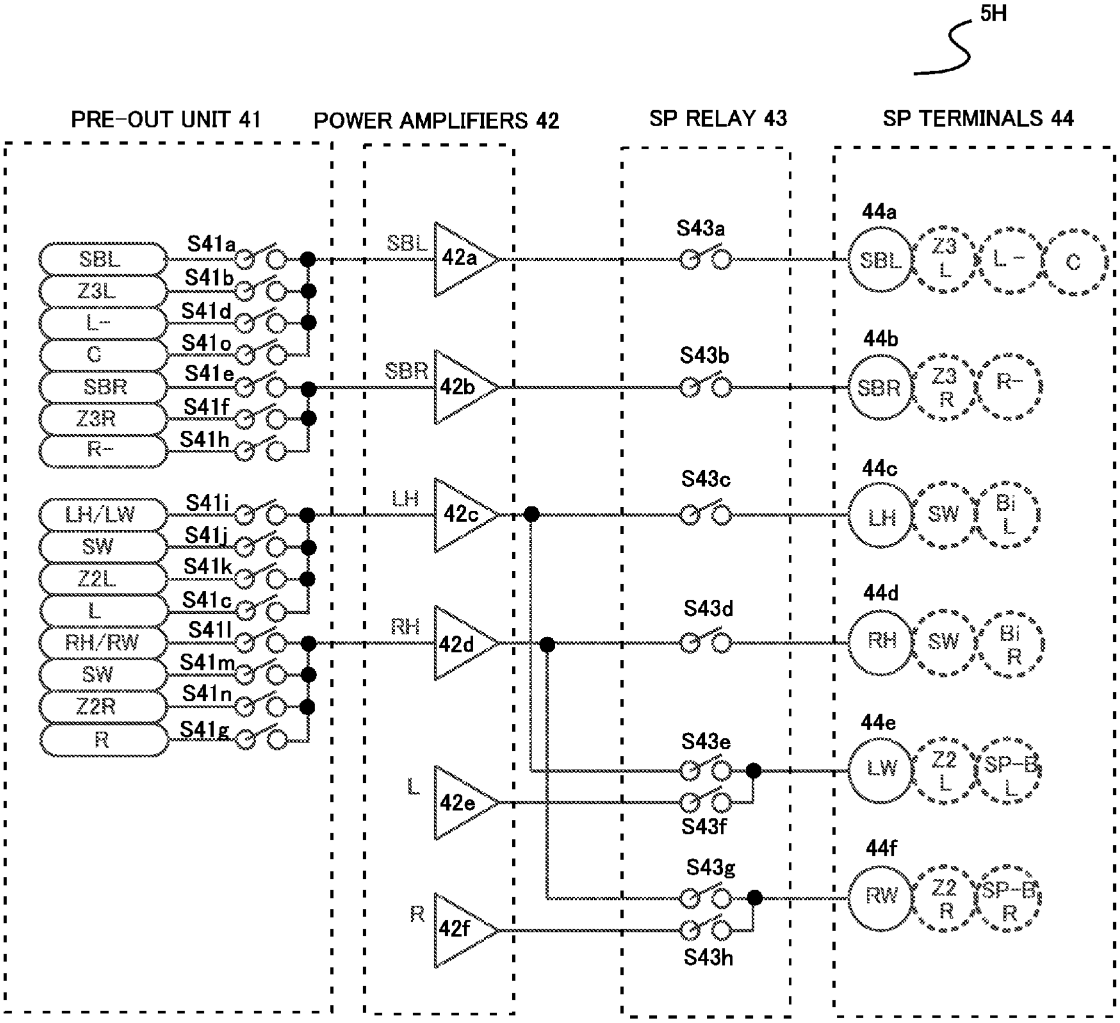
FIG. 13 is a diagram showing an audio processing unit 5H.

Next, an audio processing unit 5H of an AV amplifier according to yet another preferred embodiment of the present invention will be described with reference to FIG. 13. The audio processing unit 5H is a variant of the audio processing unit 5E in FIG. 10. A center audio signal C (for Bi-Amp) is outputted from the surround back left SP terminal 44*a*. In this case, the center audio signal C is (the left audio signal L, the right audio signal R and the center audio signal C are) able to be reproduced by using the Bi-Amp function in the state that the basic 5.1 channels (a left audio signal L, a right audio signal R, a center audio signal C, a low-frequency audio signal SW, a surround left audio signal SL, and a surround right audio signal SR) are reproduced.

The switch S41*o* switches whether to output a center audio signal C (for Bi-Amp) inputted from the DSP, to the amplifier 42*a*.

The amplifier 42*a* amplifies the surround back left audio signal SBL, the Zone3 left audio signal Z3L, the BTL left audio signal L−, or the center audio signal C (for Bi-Amp) inputted thereto and supplies the amplified audio signal to a switch S43*a*.

The switch S43*a* switches whether to supply the surround back left audio signal SBL, the Zone3 left audio signal Z3L, the BTL left audio signal L−, or the center audio signal C (for Bi-Amp) inputted from the amplifier 42*a*, to the surround back left SP terminal 44*a*.

For Bi-Amp function, the center SP terminal of the AV amplifier is connected to a woofer terminal of the center speaker SC and the surround back left SP terminal 44*a* is connected to a tweeter terminal of the center speaker SC.

(1) When the Bi-Amp Function is Used

A control unit 2 controls the DSP and the switches to supply the center audio signal C (for Bi-Amp) to the surround back left SP terminal 44*a* via the amplifier 42*a*. Specifically, the control unit 2 causes the DSP to supply the center audio signal C (for Bi-Amp) to the switch S41*o*. The control unit 2 controls the switches S410 and S43*a* to be an on state and the switches S41*a*, S41*b* and S41*d* to be an off state.

The other case is similar to the audio processing unit 5E in FIG. 10. Specifically, when the Bi-Amp function is not used, for example, the control unit 2 controls the DSP and the switches so that the surround back left audio signal SBL is supplied to the surround back left SP terminal 44*a* via the amplifier 42*a*.

Furthermore, when the center audio signal C is reproduced by using the Bi-Amp function, the control unit 2 may cause the DSP to supply the adding signal that is a signal produced by adding the surround back left audio signal SBL and the surround back right audio signal SBR instead of the surround back right audio signal. In this case, the adding signal is able to be outputted from the surround back right SP terminal 44*b*. Furthermore, the audio processing unit 5H may be configured so that the center audio signal C (for Bi-Amp) is outputted from the surround back right SP terminal 44*b* instead of the surround back left SP terminal 44*a*.

Figure 14:
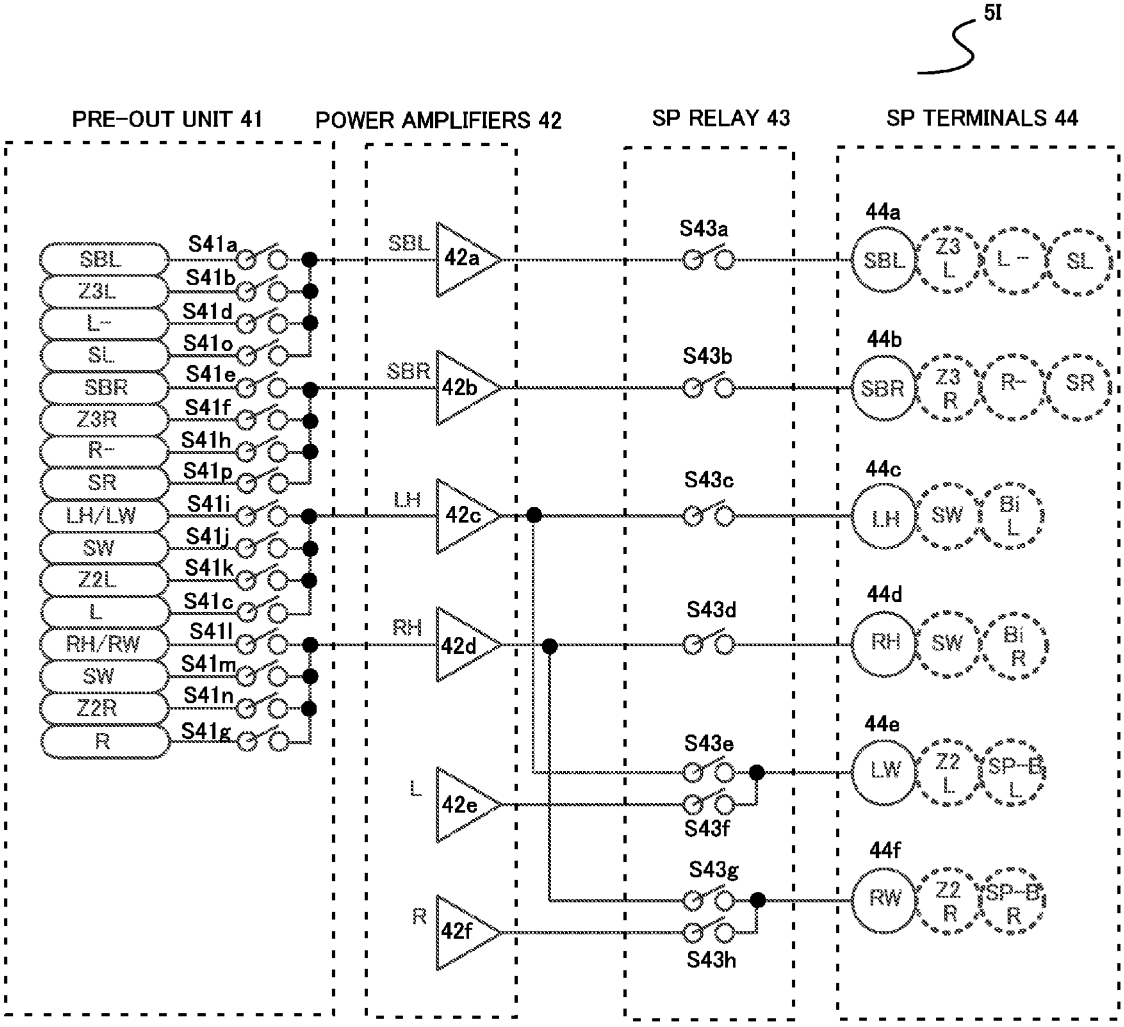
FIG. 14 is a diagram showing an audio processing unit 5I.

Next, an audio processing unit 5I of an AV amplifier according to yet another preferred embodiment of the present invention will be described with reference to FIG. 14. The audio processing unit 5I is a variant of the audio processing unit 5E in FIG. 10. A surround left audio signal SL (for Bi-Amp) is outputted from the surround back left SP terminal 44*a*. A surround right audio signal SR (for Bi-Amp) is outputted from the surround back right SP terminal 44*b*. In this case, the surround left audio signal SL and the surround right audio signal SR (the left audio signal, the right audio signal, the surround left audio signal SL and the surround right audio signal SR) are able to be reproduced by using the Bi-Amp function in the state that the basic 5.1 channels (a left audio signal L, a right audio signal R, a center audio signal C, a low-frequency audio signal SW, a surround left audio signal SL, and a surround right audio signal SR) are reproduced.

The switch S410 switches whether to output a surround left audio signal SL (for Bi-Amp) inputted from the DSP, to the amplifier 42*a*. The switch 541*p* switches whether to output a surround right audio signal SR (for Bi-Amp) inputted from the DSP, to the amplifier 42*b*.

The amplifier 42*a* amplifies the surround back left audio signal SBL, the Zone3 left audio signal Z3L, the BTL left audio signal L−, or the surround left audio signal SL (for Bi-Amp) inputted thereto and supplies the amplified audio signal to a switch S43*a*. The amplifier 42*b* amplifies the surround back right audio signal SBR, the Zone3 right audio signal Z3R, the BTL right audio signal R−, or the surround right audio signal SR (for Bi-Amp) inputted thereto and supplies the amplified audio signal to a switch S43*b*.

The switch S43*a* switches whether to supply the surround back left audio signal SBL, the Zone3 left audio signal Z3L, the BTL left audio signal L−, or the surround left audio signal SL (for Bi-Amp) inputted from the amplifier 42*a*, to the surround back left SP terminal 44*a*. The switch S43*b* switches whether to supply the surround back right audio signal SBR, the Zone3 right audio signal Z3R, the BTL right audio signal R−, or the surround right audio signal SR (for Bi-Amp) inputted from the amplifier 42*b*, to the surround back right SP terminal 44*b*.

For Bi-Amp function, the surround left SP terminal of the AV amplifier is connected to a woofer terminal of the surround left speaker SSL and the surround back left SP terminal 44*a* is connected to a tweeter terminal of the surround left speaker SSL. The surround right SP terminal of the AV amplifier is connected to a woofer terminal of the surround right speaker SSR and the surround back right SP terminal 44*b* is connected to a tweeter terminal of the surround right speaker SSR.

(1) When the Bi-Amp Function is Used

A control unit 2 controls the DSP and the switches to supply the surround left audio signal SL (for Bi-Amp) to the surround back left SP terminal 44*a* via the amplifier 42*a* and to supply the surround right audio signal SR (for Bi-Amp) to the surround back right SP terminal 44*b* via the amplifier 42*b*. Specifically, the control unit 2 causes the DSP to supply the surround left audio signal SL (for Bi-Amp) to the switch S41*o* and to supply the surround right audio signal SR (for Bi-Amp) to the switch 541*p*. The control unit 2 controls the switches S41*o*, S41*p*, S43*a* and S43*b* to be an on state and the switches S41*a*, S41*b*, S41*d*, S41*e*, S41*f* and S41*h* to be an off state.

The other case is similar to the audio processing unit 5E in FIG. 10. Specifically, when the Bi-Amp function is not used, for example, the control unit 2 controls the DSP and the switches so that the surround back left audio signal SBL is supplied to the surround back left SP terminal 44*a* via the amplifier 42*a* and so that the surround back right audio signal SBR is supplied to the surround back right SP terminal 44*b* via the amplifier 42*b*.

Although the preferred embodiments of the present invention are described above, the present invention is not limited thereto. Instead of an upper left audio signal and an upper right audio signal, a center left audio signal (a signal between a left audio signal and a center audio signal) and a center right audio signal (a signal between a right audio signal and the center audio signal) may be applied. A signal which is one of the outer left audio signal, the upper left audio signal and the center left audio signal is defined as an expansion left audio signal. A signal which is one of the outer right audio signal, the upper right audio signal and the center right audio signal is defined as an expansion right audio signal. A signal which is one of the outer left audio signal, the upper left audio signal and the center left audio signal and is different from the expansion left audio signal is defined as a second expansion left audio signal. A signal which is one of the outer right audio signal, the upper right audio signal and the center right audio signal and is different from the expansion right audio signal is defined as a second expansion right audio signal. The present invention may also be provided in the form of a program that causes a computer to perform the above-described operations of an AV amplifier, and a recording medium recording the program.

What is claimed is:

1. An audio processing apparatus comprising:

a first amplification section for amplifying an expansion left audio signal whish is one of an outer left audio signal, an upper left audio signal and a center left audio signal, or a left audio signal for Bi-Amp;

a second amplification section for amplifying an expansion right audio signal whish is one of an outer right audio signal, an upper right audio signal and a center right audio signal, or a right audio signal for Bi-Amp;

a third amplification section for amplifying a surround back left audio signal;

a fourth amplification section for amplifying a surround back right audio signal;

a first speaker terminal that outputs the expansion left audio signal or the left audio signal for Bi-Amp;

a second speaker terminal that outputs the expansion right audio signal or the right audio signal for Bi-Amp;

a third speaker terminal that outputs the surround back left audio signal;

a fourth speaker terminal that outputs the surround back right audio signal; and switching section for causing the first amplification section to amplify the expansion left audio signal and supply the amplified expansion left audio signal to the first speaker terminal and causing the second amplification section to amplify the expansion right audio signal and supply the amplified expansion right audio signal to the second speaker terminal when the Bi-Amp function is not used; and causing the first amplification section to amplify the left audio signal for Bi-Amp and supply the amplified left audio signal for Bi-Amp to the first speaker terminal and causing the second amplification section to amplify the right audio signal for Bi-Amp and supply the amplified right audio signal for Bi-Amp to the second speaker terminal when the Bi-Amp function is used.

2. The audio processing apparatus according to claim 1, wherein the third amplification section amplifies the surround back left audio signal or a center audio signal for Bi-Amp;

the third speaker terminal outputs the surround back left audio signal or the center audio signal for Bi-Amp, and the switching section causes the third amplification section to amplify the surround back left audio signal and supply the amplified surround back left audio signal to the third speaker terminal when the Bi-Amp function is not used; and causes the third amplification section to amplify the center audio signal for Bi-Amp and supply the amplified center audio signal for Bi-Amp to the third speaker terminal when the Bi-Amp function is used.

3. The audio processing apparatus according to claim 2, wherein when the Bi-Amp function is used, the switching section causes the fourth amplification section to amplify the adding signal that is a signal produced by adding the surround back left audio signal and the surround back right audio signal and supply the amplified adding signal to the fourth speaker terminal.

4. The audio processing apparatus according to claim 1, wherein the third amplification section amplifies the surround back left audio signal or the surround left audio signal for Bi-Amp;

the fourth amplification section amplifies the surround back right audio signal or the surround right audio signal for Bi-Amp;

the third speaker terminal outputs the surround back left audio signal or the surround left audio signal for Bi-Amp, the fourth speaker terminal outputs the surround back right audio signal or the surround right audio signal for Bi-Amp, and the switching section causes the third amplification section to amplify the surround back left audio signal and supply the amplified surround back left audio signal to the third speaker terminal and the fourth amplification section to amplify the surround back right audio signal and supply the amplified surround back right audio signal to the fourth speaker terminal when the Bi-Amp function is not used; and causes the third amplification section to amplify the surround left audio signal for Bi-Amp and supply the amplified surround left audio signal for Bi-Amp to the third speaker terminal and the fourth amplification section to amplify the surround right audio signal for Bi-Amp and supply the amplified surround right audio signal for Bi-Amp to the fourth speaker terminal when the Bi-Amp function is used.

5. The audio processing apparatus according to claim 1, further comprising:

a fifth speaker terminal that outputs the second expansion left audio signal whish is one of the outer left audio signal, the upper left audio signal and the center left audio signal and is different from the expansion left audio signal;

a sixth speaker terminal that outputs the second expansion right audio signal whish is one of the outer right audio signal, the upper right audio signal and the center right audio signal and is different from the expansion right audio signal; and channel determination section for determining which one of a combination of the expansion left audio signal and the expansion right audio signal and a combination of the second expansion left audio signal and second expansion right audio signal is included in multichannel audio data, wherein in case that the Bi-Amp function is not used, the switching section causes the first amplification section to amplify the expansion left audio signal and supply the amplified expansion left audio signal to the first speaker terminal and causes the second amplification section to amplify the expansion right audio signal and supply the amplified expansion right audio signal to the second speaker terminal when the combination of the expansion left audio signal and the expansion right audio signal is determined to be included; and causes the first amplification section to amplify the second expansion left audio signal and supply the amplified second expansion left audio signal to the fifth speaker terminal and causes the second amplification section to amplify the second expansion right audio signal and supply the amplified second expansion right audio signal to the sixth speaker terminal when the combination of the second expansion left audio signal and second expansion right audio signal is determined to be included.

* * * * *